United States Patent
Aikawa et al.

(10) Patent No.: US 11,868,964 B2
(45) Date of Patent: Jan. 9, 2024

(54) PRODUCTION PLAN CREATION DEVICE AND NON-TRANSITORY COMPUTER READABLE MEDIUM

(71) Applicant: FUJIFILM Business Innovation Corp., Tokyo (JP)

(72) Inventors: Kiyofumi Aikawa, Kanagawa (JP); Ryosuke Takahashi, Kanagawa (JP); Shuhei Kobayakawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/224,151

(22) Filed: Apr. 7, 2021

(65) Prior Publication Data

US 2022/0019973 A1  Jan. 20, 2022

(30) Foreign Application Priority Data

Jul. 17, 2020  (JP) ................................ 2020-122636

(51) Int. Cl.
| | |
|---|---|
| *G06Q 10/0631* | (2023.01) |
| *G06Q 10/10* | (2023.01) |
| *G06F 3/14* | (2006.01) |
| *G06Q 50/04* | (2012.01) |
| *G06Q 10/0639* | (2023.01) |

(52) U.S. Cl.
CPC ............. *G06Q 10/103* (2013.01); *G06F 3/14* (2013.01); *G06Q 10/06313* (2013.01); *G06Q 10/063118* (2013.01); *G06Q 50/04* (2013.01); *G06Q 10/06393* (2013.01)

(58) Field of Classification Search
None
See application file for complete search history.

(56) References Cited

U.S. PATENT DOCUMENTS

| | | | |
|---|---|---|---|
| 2008/0071716 A1* | 3/2008 | Anderson | G06N 5/04 706/45 |
| 2008/0300706 A1* | 12/2008 | Ruml | G06Q 50/04 700/100 |
| 2018/0373230 A1* | 12/2018 | Hamling | G05B 19/41885 |
| 2020/0151633 A1* | 5/2020 | Suginishi | G06Q 10/06312 |

FOREIGN PATENT DOCUMENTS

JP           2000330966         11/2000

OTHER PUBLICATIONS

L. Braccesi, M. Monsignori and P. Nesi, "Monitoring and optimizing industrial production processes," Proceedings. Ninth IEEE International Conference on Engineering of Complex Computer Systems, Florence, Italy, 2004, pp. 213-222, doi: 10.1109/ICECCS.2004.1310920. (Year: 2004).*

* cited by examiner

*Primary Examiner* — Stephanie Z Delich
(74) *Attorney, Agent, or Firm* — JCIPRNET

(57) ABSTRACT

A production plan creation device includes a processor configured to determine, when creating a plan for multiple tasks performed to produce a product, multiple candidate plans having a most favorable value for each of multiple predetermined evaluation indicators, and cause the multiple candidate plans to be displayed such that the respective evaluation values of the multiple evaluation indicators are comparable.

11 Claims, 21 Drawing Sheets

CUTTING MACHINE

| DATE | TIME | CURRENTLY SET PLAN | 1ST CANDIDATE | 2ND CANDIDATE | 3RD CANDIDATE |
|---|---|---|---|---|---|
| 8/1 | 7 | | | | |
| | 8 | | | | |
| | 9 | | | | |
| | 10 | | | | |
| | 11 | | | | |
| | 12 | | | | |
| | 13 | 3RD TASK WORKER L | | | |
| | 14 | 3RD TASK WORKER L | 3RD TASK WORKER L | | |
| | 15 | | | | |
| | 16 | | | 3RD TASK WORKER L | 6TH TASK WORKER L |
| | 17 | | | | |
| | 18 | | | | |
| | 19 | | | | |
| 8/2 | 7 | | | | |
| | 8 | | 6TH TASK WORKER L | 3RD TASK WORKER L | 3RD TASK WORKER L |
| | 9 | | 1ST TASK WORKER L | 6TH TASK WORKER L | |
| | 10 | 1ST TASK WORKER L | 1ST TASK WORKER L | | |
| | 11 | | | | |
| | 12 | | | 1ST TASK WORKER L | 1ST TASK WORKER L |
| | 13 | | | | |
| | 14 | | | | |
| | 15 | | | | |
| | 16 | | | | |
| | 17 | | | | |
| | 18 | | | | |
| | 19 | | | | |

BINDING MACHINE

| DATE | TIME | CURRENTLY SET PLAN | 1ST CANDIDATE | 2ND CANDIDATE | 3RD CANDIDATE |
|---|---|---|---|---|---|
| 8/1 | 7 | | | | |
| | 8 | | | | |
| | 9 | 5TH TASK WORKER M | 5TH TASK WORKER M | 5TH TASK WORKER M | 5TH TASK WORKER M |
| | 10 | | | | |
| | 11 | | | | |
| | 12 | | | | |
| | 13 | 5TH TASK WORKER M | 5TH TASK WORKER M | 5TH TASK WORKER M | 5TH TASK WORKER M |
| | 14 | | | | |
| | 15 | | | | |
| | 16 | | | | |
| | 17 | | | | |
| | 18 | | | | |
| | 19 | | | | |
| 8/2 | 7 | | | | |
| | 8 | | | | |
| | 9 | | | | 6TH TASK WORKER M |
| | 10 | 3RD TASK WORKER M | 3RD TASK WORKER M | 3RD TASK WORKER M | |
| | 11 | | | | |
| | 12 | | | | |
| | 13 | | | 3RD TASK WORKER M | 3RD TASK WORKER M |
| | 14 | | 6TH TASK WORKER M | | |
| | 15 | 1ST TASK WORKER M | 1ST TASK WORKER M | 6TH TASK WORKER M | |
| | 16 | | | | |
| | 17 | | | | |
| | 18 | | | | |
| | 19 | | | | |

4TH TASK

| DATE | TIME | CURRENTLY SET PLAN | 1ST CANDIDATE | 2ND CANDIDATE | 3RD CANDIDATE |
|---|---|---|---|---|---|
| 8/1 | 7 | | | | |
| | 8 | | | | |
| | 9 | | | | |
| | 10 | | | | |
| | 11 | | | | |
| | 12 | | | | |
| | 13 | | | | |
| | 14 | | | | |
| | 15 | 2ND PRINTING MACHINE WORKER K | 2ND PRINTING MACHINE WORKER K | 2ND PRINTING MACHINE WORKER K | 2ND PRINTING MACHINE WORKER K |
| | 16 | | | | |
| | 17 | | | | |
| | 18 | | | | |
| | 19 | | | | |
| 8/2 | 7 | 2ND PRINTING MACHINE WORKER H | 2ND PRINTING MACHINE WORKER H | 2ND PRINTING MACHINE WORKER H | 2ND PRINTING MACHINE WORKER H |
| | 8 | 2ND PRINTING MACHINE WORKER H | 2ND PRINTING MACHINE WORKER H | 2ND PRINTING MACHINE WORKER H | 2ND PRINTING MACHINE WORKER H |
| | 9 | | | | |
| | 10 | | | | |
| | 11 | | | | |
| | 12 | | | | |
| | 13 | | | | |
| | 14 | 2ND PRINTING MACHINE WORKER H | 2ND PRINTING MACHINE WORKER H | 2ND PRINTING MACHINE WORKER H | 2ND PRINTING MACHINE WORKER H |
| | 15 | 2ND PRINTING MACHINE WORKER H | 2ND PRINTING MACHINE WORKER H | 2ND PRINTING MACHINE WORKER H | 2ND PRINTING MACHINE WORKER H |
| | 16 | | | | |
| | 17 | | | | |
| | 18 | | | | |
| | 19 | | | | |

5TH TASK

| DATE | TIME | CURRENTLY SET PLAN | 1ST CANDIDATE | 2ND CANDIDATE | 3RD CANDIDATE |
|---|---|---|---|---|---|
| 8/1 | 7 | | | | |
| | 8 | | | | |
| | 9 | | | | |
| | 10 | BINDING MACHINE WORKER M | BINDING MACHINE WORKER M | BINDING MACHINE WORKER M | BINDING MACHINE WORKER M |
| | 11 | | | | |
| | 12 | | | | |
| | 13 | | | | |
| | 14 | BINDING MACHINE WORKER M | BINDING MACHINE WORKER M | BINDING MACHINE WORKER M | BINDING MACHINE WORKER M |
| | 15 | | | | |
| | 16 | | | | |
| | 17 | | | | |
| | 18 | | | | |
| | 19 | | | | |
| 8/2 | 7–19 | | | | |

6TH TASK

| DATE | TIME | CURRENTLY SET PLAN | 1ST CANDIDATE | 2ND CANDIDATE | 3RD CANDIDATE |
|---|---|---|---|---|---|
| 8/1 | 7 | | | | |
| | 8 | | 1ST PRINTING MACHINE WORKER H | 2ND PRINTING MACHINE WORKER K | 1ST PRINTING MACHINE WORKER H |
| | 9 | | | | |
| | 10 | | | | |
| | 11 | | | | |
| | 12 | | | | |
| | 13 | | | | CUTTING MACHINE WORKER L |
| | 14 | | | | |
| | 15 | | | | |
| | 16 | | | | |
| | 17 | | | | |
| | 18 | | | | |
| | 19 | | | | |
| 8/2 | 7 | | | | |
| | 8 | | | | |
| | 9 | | | | |
| | 10 | | CUTTING MACHINE WORKER L | CUTTING MACHINE WORKER L | BINDING MACHINE WORKER M |
| | 11 | | | | |
| | 12 | | BINDING MACHINE WORKER M | BINDING MACHINE WORKER M | |
| | 13 | | | | |
| | 14 | | | | |
| | 15 | | | | |
| | 16 | | | | |
| | 17 | | | | |
| | 18 | | | | |
| | 19 | | | | |

PRODUCTION PLAN CREATION DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-122636 filed Jul. 17, 2020.

BACKGROUND

(i) Technical Field

The present disclosure relates to a production plan creation device and a non-transitory computer readable medium.

(ii) Related Art

For example, a scheduling device described in Japanese Unexamined Patent Application Publication No. 2000-330966 is configured as follows. Namely, multiple pieces of order data and multiple pieces of production resource data are input, a weighting is input for each of multiple schedule targets in a scheduling process, multiple pieces of combination data indicating an assignment of the multiple pieces of order data and the multiple pieces of production resource data on the basis of the weighting data are created and evaluated by a genetic algorithm for example, the combination data having the highest evaluation is determined, and the schedule of the determined combination data is displayed.

SUMMARY

The evaluation indicators to treat as important may be different depending on the time and place in some cases. Also, the plan (schedule) optimized according to the evaluation indicators may be different in some cases. Therefore, when determining the final plan, it is desirable to be able to select from among multiple plans, with each plan having the most favorable value for one of multiple evaluation indicators.

Aspects of non-limiting embodiments of the present disclosure relate to enabling a final plan to be selected from among multiple candidate plans.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a production plan creation device including a processor configured to determine, when creating a plan for multiple tasks performed to produce a product, multiple candidate plans having a most favorable value for each of multiple predetermined evaluation indicators, and cause the multiple candidate plans to be displayed such that the respective evaluation values of the multiple evaluation indicators are comparable.

BRIEF DESCRIPTION OF THE DRAWINGS

Exemplary embodiments of the present disclosure will be described in detail based on the following figures, wherein:

FIG. 7 illustrates an example of a first detailed table;

FIG. 8 is an enlarged view of the portion VIII in FIG. 7;

FIG. 9 is an enlarged view of the portion IX in FIG. 7;

FIG. 10 illustrates an example of a second detailed table;

FIG. 11 is an enlarged view of the portion XI in FIG. 10;

FIG. 12 is an enlarged view of the portion XII in FIG. 10;

FIG. 13 illustrates an example of a third detailed table;

FIG. 14 is an enlarged view of the portion XIV in FIG. 13;

FIG. 15 is an enlarged view of the portion XV in FIG. 13;

FIG. 16 illustrates an example of a fourth detailed table;

FIG. 17 is an enlarged view of the portion XVII in FIG. 16;

FIG. 18 is an enlarged view of the portion XVIII in FIG. 16;

FIG. 19 illustrates an example of a fifth detailed table;

FIG. 20 is an enlarged view of the portion XX in FIG. 19; and

FIG. 21 is an enlarged view of the portion XXI in FIG. 19.

DETAILED DESCRIPTION

Hereinafter, exemplary embodiments of the present disclosure will be described with reference to the attached drawings.

Figure 1:
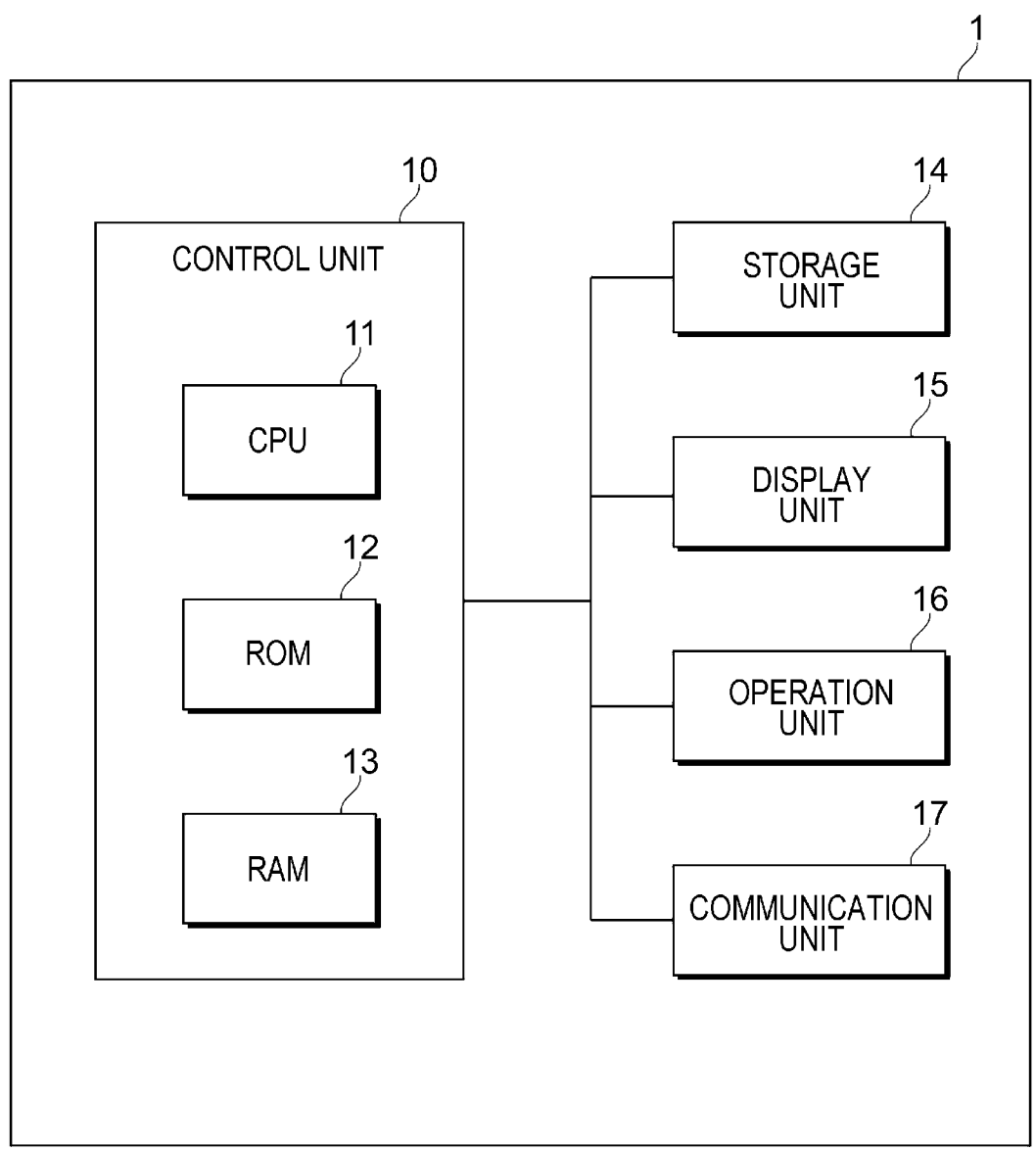
FIG. 1 is a diagram illustrating a hardware configuration example of a production plan creation device according to an exemplary embodiment.

FIG. 1 is a diagram illustrating a hardware configuration example of a production plan creation device 1 according to an exemplary embodiment.

The production plan creation device 1 according to the exemplary embodiment is a device that plans out dates and times when multiple products are to be produced at a site such as a factory that produces products using resources such as machines, for example. For example, in a factory that produces printed materials such as catalogs, posters, and flyers as examples of products, there is demand for printed materials requested for production using a printing machine as an example of a machine to be produced in time to meet a predetermined deadline. The production plan creation device 1 is a device that creates a production plan to meet deadlines while accounting for factors such as the time taken to produce the printed materials.

As illustrated in FIG. 1, the production plan creation device 1 is provided with a control unit 10. The control unit 10 includes a central processing unit (CPU) 11, read-only memory (ROM) 12 that acts as a storage area storing programs such as a basic input-output system (BIOS), and random access memory (RAM) 13 that acts as a program execution area.

The production plan creation device 1 is also provided with a storage unit 14 that stores various programs such as an operating system (OS) and applications, input data for the various programs, and output data from the various programs. The storage unit 14 may be a storage device such as a hard disk drive (HDD) or semiconductor memory, for example.

Additionally, the production plan creation device 1 is provided with a display unit 15 used to display an operation reception screen and images, an operation unit 16 that receives input operations from a user, and a communication unit 17 used to communicate with external devices.

The display unit 15 may be a liquid crystal display (LCD) or an organic EL (OLED) display, for example.

The operation unit 16 may be a keyboard, a mouse, or a touch panel, for example. In the case where the operation unit 16 is a touch panel, the touch panel functions as the operation unit 16 and the display unit 15.

The communication unit 17 may be a communication interface (communication I/F), for example.

The production plan creation device 1 may be a laptop personal computer (PC), a desktop PC, a tablet PC, a tablet, a personal digital assistant (PDA), or a multifunctional mobile phone (also known as a "smartphone"), for example.

(Controller 10)

The control unit 10 acquires information about multiple tasks performed to produce a product using resources, and determines a tentative order (hereinafter referred to as the "provisional order" in some cases) of two or more tasks among the multiple tasks while accounting for a predetermined condition for performing the multiple tasks. Additionally, the control unit 10 creates a provisional plan in which resources are assigned in an order obtained by correcting the provisional order to account for the condition, and creates a candidate plan on the basis of an evaluation of the provisional plan. The predetermined condition is a condition specified by the user, and is a condition that is accounted for when determining the provisional order and also when determining a corrected provisional order obtained by correcting the provisional order. The predetermined condition may be a condition for determining a provisional order while excluding tasks that are assigned already, and inserting tasks that are assigned already to the front of the provisional order when correcting the provisional order, for example. Also, in the case where a grouping condition for grouping several of the multiple tasks together is specified, the predetermined condition may be a condition for determining a provisional order while excluding another task other than a first task among the multiple grouped tasks, and placing the other task in sequential order with the first task when correcting the provisional order, for example.

Here, in the following description, the case of producing requested printed materials will be illustrated as an example of tasks. In the case where the printed materials are a catalog for example, completing the printed materials may involve multiple steps such as a printing step, a cutting step, and a binding step, for example. The printing step is a step of a printing process executed by a printing machine on the basis of a print command that includes image data to be printed and settings for the process performed by the printing machine. The printing machine may be an offset printing machine or a digital image forming device such as a digital copier or a digital multi-function device, for example. Additionally, before the printing step, the print command is generated by performing work such as planning, editing, and layout of the printed materials after receiving image data provided by a client, and settings such as the number of pages or the number of copies to print and the type of paper to use for printing are determined. Also, a single print command is divided into the respective parts of the printed materials, such as "cover" and "body text" for example, and settings such as whether or not to perform the printing process for each part are also determined. Consequently, before the printing step, it is possible to predict how much work time will be taken in each of the steps such as the printing step, the cutting step, and the binding step, or how much preparation time will be taken between steps, until the printed materials are completed. Note that preparation time includes the time taken to transport materials between machines, such as from the printing machine to the cutting machine, for example.

In the case where the production of multiple printed materials is requested, ordinarily, a deadline is set by the request for each of the printed materials, and there is a demand to proceed with each step to meet the deadline. Accordingly, the control unit 10 plans out the date and time of each step while accounting for factors such as the running time and the stopped time of the machines such as the printing machine that performs a printing process in the printing step, the cutting machine that performs a cutting process in the cutting step, and a binding machine that performs a binding process in the binding step, and also factors such as the work times and break times of workers.

Figure 2:
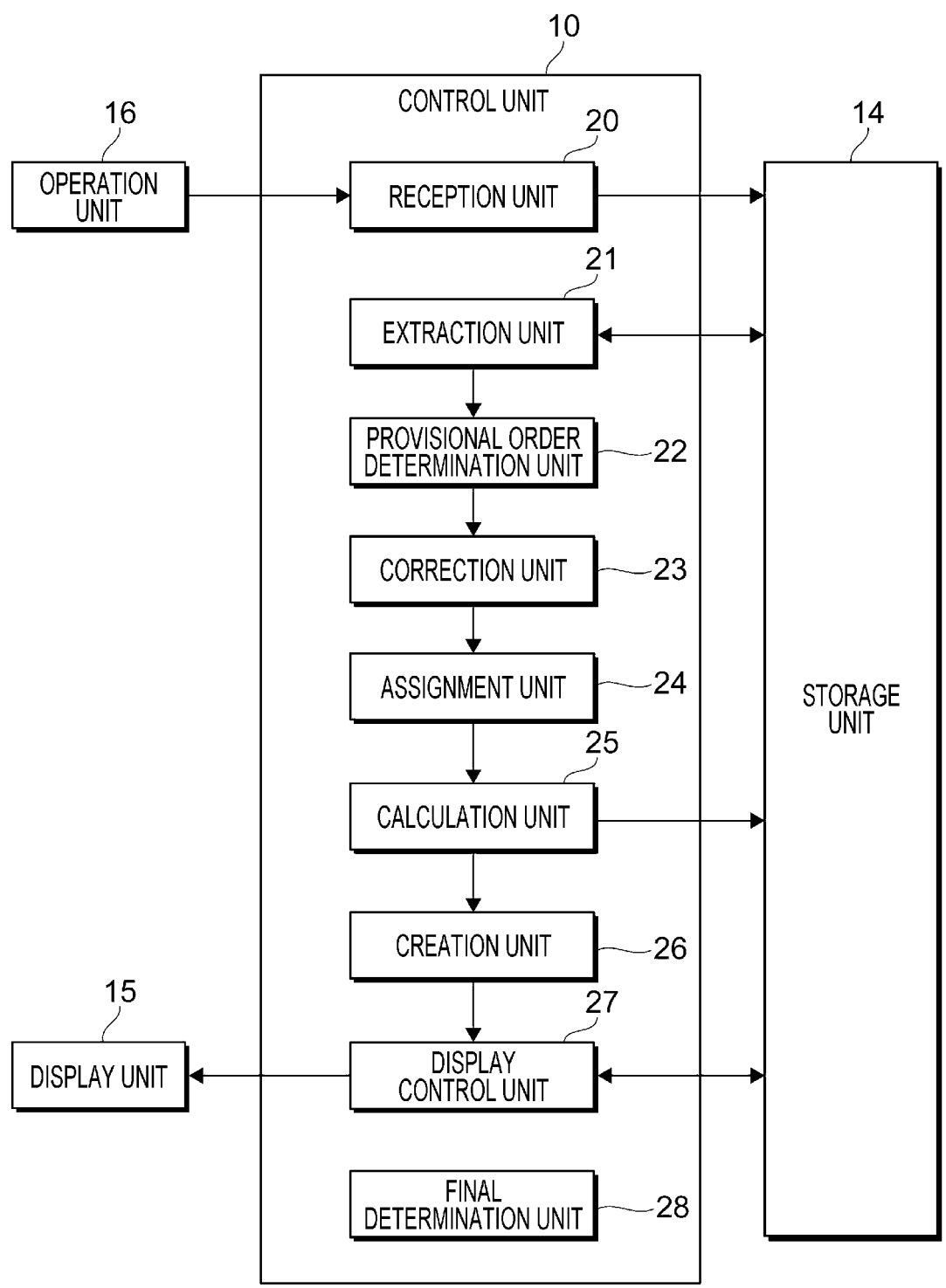
FIG. 2 is a diagram illustrating one example of a block diagram illustrating a functional configuration of a control unit.

FIG. 2 is a diagram illustrating one example of a block diagram illustrating a functional configuration of the control unit 10.

The control unit 10 includes a reception unit 20 that receives information input by the user through the operation unit 16. The control unit 10 is also provided with an extraction unit 21 that extracts multiple tasks when determining the provisional order for assigning multiple tasks for which to create a production plan (hereinafter referred to as the "planning target tasks" in some cases) and a provisional order determination unit 22 that determines a provisional order of the multiple tasks extracted by the extraction unit 21. Additionally, the control unit 10 is provided with a correction unit 23 that corrects the provisional order determined by the provisional order determination unit 22 according to a predetermined rule, and an assignment unit 24 that assigns a corrected provisional order corrected by the correction unit 23 to resources such as machines and workers. The control unit 10 is also provided with a calculation unit 25 that calculates an evaluation indicator (hereinafter referred to as a key performance indicator (KPI) in some cases) for the plan assigned by the assignment unit 24, and a creation unit 26 that uses the KPI calculated by the calculation unit 25 to create a candidate plan that acts as a candidate of a final plan. Also, the control unit 10 is provided with a display control unit 27 that causes the plan created by the creation unit 26 to be displayed on a display screen of the display unit 15, and a final determination unit 28 that determines the final plan.

Hereinafter, each component included in the control unit 10 will be described.

(Reception Unit 20)

The reception unit 20 is capable of receiving planning target tasks. The reception unit 20 is also capable of receiving information related to planning target tasks and information related to resources. The information related to planning target tasks may be a customer, a deadline, and a product shipping destination, for example. The information related to resources may be information about the running state of machines, information about the work times of workers, and the like.

The reception unit 20 receives information input by the user through the operation unit 16 and information transmitted from a processing device different from the production plan creation device 1, such as a laptop PC, a desktop PC, a tablet PC, a tablet, a personal digital assistant (PDA), or a multifunctional mobile phone (also known as a "smartphone").

The reception unit 20 is capable of receiving a grouping condition for grouping several of the multiple tasks. The grouping condition may be a condition for grouping tasks for the same customer, grouping multiple tasks for the same or related products, grouping multiple tasks for products having the same type of paper, and grouping multiple tasks having product shipping destinations in the same geographical region, for example. In addition, the grouping condition may be a condition for grouping tasks in an order that makes it easy for a worker to perform the work, grouping tasks to be in the same order as the page order of a product, grouping tasks for products having the same color, and grouping tasks for products having the same size, for example.

The reception unit 20 is also capable of receiving a work method or a processing method for tasks. For example, the reception unit 20 is capable of receiving a specification of a machine with respect to a task, a specification of a worker with respect to task, and a specification of a work time of a worker with respect to a task. Also, the reception unit 20 is capable is receiving a specification such as dividing a task into predetermined units or assigning a task to multiple machines at the same time.

The reception unit 20 is also capable of receiving information about the times of tasks and resources. For example, the reception unit 20 is capable of receiving a specification of the time between a first step and another step in a single task, a specification of the time between a first task and another task at the same machine, a specification of working hours, a specification of the priority of a task, a specification of a target work completion date and time for a task, and a specification of a work acceleration limit time for a task. Additionally, the reception unit 20 is capable of receiving a specification of a deadline margin time that is desirable to secure for a single task and a specification of an allowed quantity as the inventory of work in process or a finished product. Note that the deadline margin time for a task is the amount of time obtained by subtracting the projected completion time of the last step in the task from the deadline, that is, the projected delivery date and time of the product produced by the task.

The reception unit 20 is also capable of receiving a priority setting for a task. For example, the reception unit 20 is capable of receiving a specification of a priority with respect to inventory, such as work that is not to be performed if the inventory is at or above a predetermined upper limit, or work that is to be prioritized if the inventory is at or below a predetermined lower limit, and a specification of a priority with respect to a customer. The reception unit 20 is also capable of receiving a task for which a production plan is already created, or in other words, a task that is already assigned. The reception unit 20 is also capable of receiving settings for a retention condition of a task in progress, such as a retention period, a machine to retain, and a worker to retain, for example.

The controller 20 is also capable of receiving a priority setting for an evaluation indicator.

In the case of receiving information input by the user, the reception unit 20 stores the received information in a predetermined storage area in the storage unit 14.

(Extraction Unit 21)

The extraction unit 21 extracts tasks to include in the provisional order from among the planning target tasks.

The extraction unit 21 acquires information about the planning target tasks. Also, in the case where an already-assigned task exists, the extraction unit 21 acquires information about the task. Also, in the case where a grouping condition for grouping several tasks from among the planning target tasks is specified, the extraction unit 21 acquires a predetermined grouping condition (for example, grouping multiple tasks for the same customer). The extraction unit 21 acquires the information from a predetermined storage area in the storage unit 14.

Additionally, in the case where an already-assigned task exists the extraction unit 21 excludes the already-assigned task from the planning target tasks. Also, in the case where tasks that satisfy a grouping condition exist, the extraction unit 21 excludes tasks other than one of the grouped tasks (for example, the task with the earliest deadline) from the remaining multiple tasks. With this arrangement, the extraction unit 21 extracts a task that has not been assigned or one of the grouped tasks from among the planning target tasks.

Figure 3:
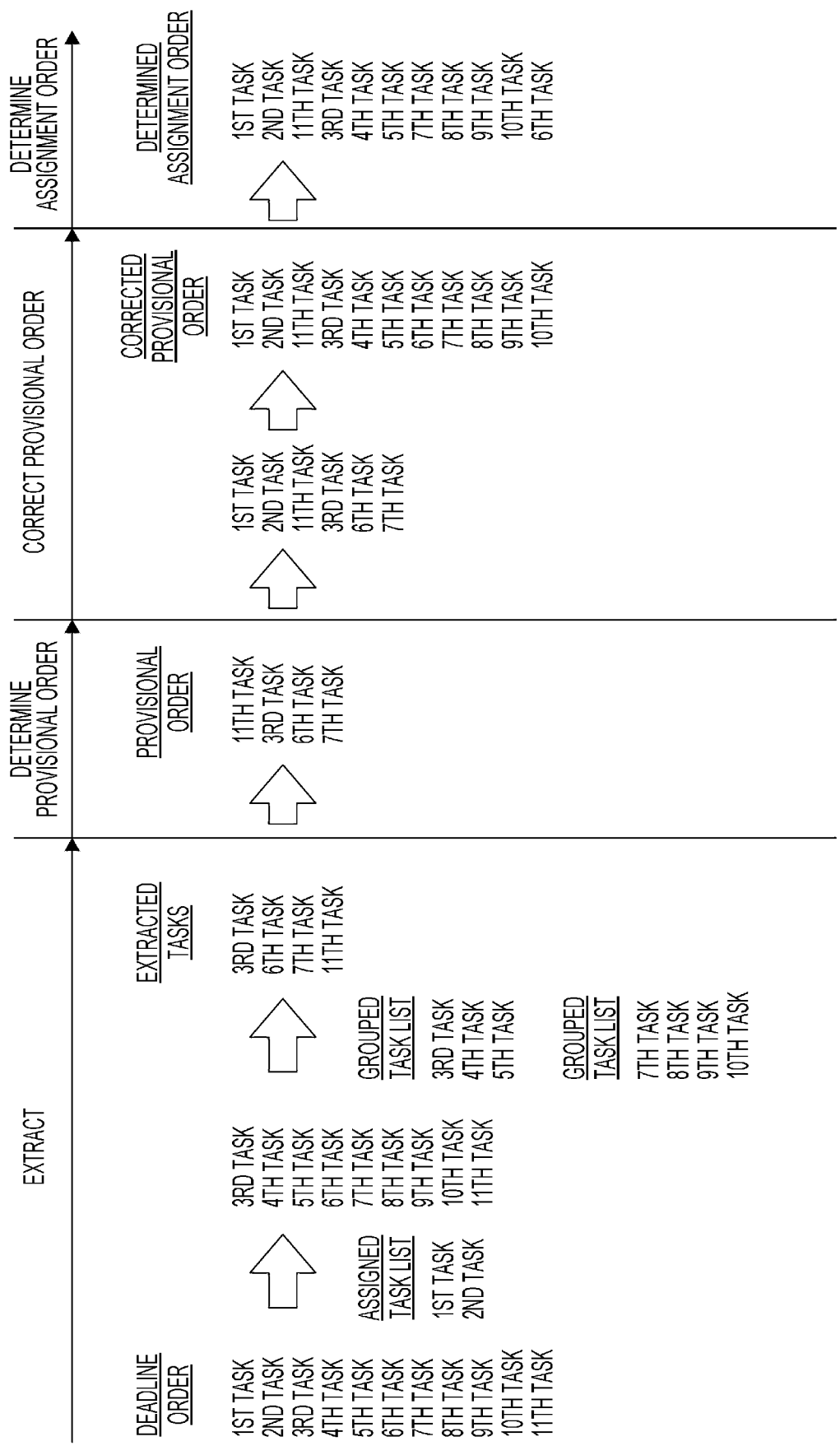
FIG. 3 is a diagram for explaining one example of a process until an assignment order is determined.

FIG. 3 is a diagram for explaining one example of a process until an assignment order is determined.

FIG. 3 will be used to describe a process of extraction performed by the extraction unit 21.

The example illustrated in FIG. 3 assumes that there are 11 planning target tasks. These 11 tasks will be referred to as the 1st to 11th tasks, where a smaller number denotes an earlier deadline. Additionally, it is assumed that the 1st task and the 2nd task are already assigned. Also, it is assumed that the 3rd to 5th tasks and the 7th to 10th tasks satisfy the grouping condition and are grouped. In such a case, the extraction unit 21 excludes the 1st and 2nd tasks that are already assigned from the 1st to 11th tasks arranged in deadline order. Also, from among the multiple remaining 3rd to 11th tasks, the extraction unit 21 excludes the 4th task, the 5th task, and the 8th to 10th tasks which are other than the 3rd task and the 7th task at the front of the grouped tasks. With this arrangement, the extraction unit 21 extracts the 3rd task, the 6th task, the 7th task, and the 11th task.

Note that if the 1st task and the 2nd task are not already assigned, the extraction unit 21 does not exclude the 1st task and the 2nd task. Also, if the 3rd to 5th tasks are not grouped, the extraction unit 21 does not exclude the 4th task and the 5th task. Also, if the 7th to 10th tasks are not grouped, the extraction unit 21 does not exclude the 8th to 10th tasks.

Also, in the example illustrated in FIG. 3, the planning target tasks are arranged in order of earliest deadline, but are not limited to being arranged in order of earliest deadline. For example, the planning target tasks may also be arranged in order of when a request for each task was received.

(Provisional Order Determination Unit 22)

The provisional order determination unit 22 determines a provisional order by rearranging the multiple tasks extracted by the extraction unit 21 according to a predetermined method. The predetermined method may be the solution to a combinatorial optimization problem, for example. Also, the solution may be a genetic algorithm or a branch and bound algorithm. In the case where the priority of the tasks is specified, the provisional order determination unit 22 determines the provisional order while accounting for the priority. For example, in the case where the priority of another task is set higher than a first task, the provisional order determination unit 22 places the other task ahead of the first task. Also, in the case where work is specified as a priority when the inventory of a specific product is at or below a predetermined lower limit, the provisional order determination unit 22 places a task for producing the product ahead of other tasks. Also, in the case where the priority with respect to customers is specified, the provisional order determination unit 22 determines the provisional order while accounting for the priority. For example, in the case where the priority of another customer is set than a first customer, the provisional order determination unit 22 places the other customer ahead of the first customer.

In the example illustrated in FIG. 3, the provisional order determination unit 22 arranges the 3rd, 6th, 7th, and 11th tasks extracted by the extraction unit 21 into the order of the 11th task, 3rd task, 6th task, and 7th task. This order of the 11th task, 3rd task, 6th task, and 7th task is the provisional order.

(Correction Unit 23)

The correction unit 23 corrects the provisional order determined by the provisional order determination unit 22 according to a predetermined rule. The predetermined rule may be placing an already-assigned task at the front of the order, for example. Also, the predetermined rule may be placing other tasks other than a first task among grouped tasks in sequential order with the first task, for example. For example, the predetermined rule may be inserting the other tasks after the first task in the case where a first task has the earliest deadline, and inserting the other tasks before the first task in the case where the first task has the latest deadline.

In the example illustrated in FIG. 3, the 1st and 2nd tasks which are already assigned are inserted before the 11th task in first place in the provisional order. Additionally, the correction unit 23 inserts the 4th and 5th tasks, which are tasks not at the front of the grouped tasks, after the third task at the front of the grouped tasks, and also inserts the 8th to 10th tasks after the 7th task at the front of the grouped tasks. The order of the 1st task, 2nd task, 11th task, 3rd task, 4th task, 5th task, 6th task, 7th task, 8th task, 9th task, and 10th task obtained after the correction by the correction unit 23 is the corrected provisional order.

(Assignment Unit 24)

The assignment unit 24 assigns the planning target tasks to machines and workers in the order of the corrected provisional order corrected by the correction unit 23. At this time, in the case where a work method or processing method for tasks is specified, the assignment unit 24 assigns the tasks while accounting for the specification. For example, in the case where a machine or a worker is specified for a task, the task is assigned to that machine or worker. Note that the running times of machines and the assignment of workers to machines are set in advance. Also, in the case where the times of tasks and resources are specified, the assignment unit 24 assigns the tasks while accounting for the specification. For example, in the case where the time between a first step and another step in a single task is specified, the assignment unit 24 assigns the first step and the other step such that the time between the first step and the other step is longer than the specified time. Similarly, in the case where the time between a first task and another task at the same machine is specified, the assignment unit 24 assigns the first task and the other task such that the time between the first task and the other task is longer than the specified time. Also, in the case where a target work completion date and time for a task or a work acceleration limit time for a task is specified, the assignment unit 24 assigns the tasks while accounting for the specification. For example, the assignment unit 24 assigns a task such that the task is completed earlier than the specified target work completion date and time. Also, in the case where an allowed quantity is specified as the inventory of work in process or a finished product, the assignment unit 24 assigns tasks such that the inventory of the work in process or finished product is less than the allowed quantity. Also, in the case where a task in progress is included and settings for a retention period, a machine to retain, and a worker to retain are retained, the assignment unit 24 assigns the tasks such that the retained items are retained.

In addition, every time a task is assigned, the assignment unit 24 calculates the deadline margin time of the task, and also determines whether or not the calculated deadline margin time is equal to or greater than a deadline margin time specified in advance (hereinafter referred to as the "reference time" in some cases). In the case where the deadline margin time is equal to or greater than the reference time, the assignment unit 24 assigns the next task in the order. On the other hand, in the case where the deadline margin time is shorter than the reference time, the assignment unit 24 assigns the task before a task earlier in the order than the assigned task. Thereafter, the assignment unit 24 recalculates the deadline margin time and again determines whether or not the deadline margin time is equal to or greater than the reference time. In this way, the assignment unit 24 assigns a task by moving the task earlier in the order until the deadline margin time is equal to or greater than the reference time.

Note that in the case of determining whether or not the deadline margin time is equal to or greater than the reference time for grouped tasks, the assignment unit 24 calculates the deadline margin time on the basis of the work time for the grouped tasks as a whole. Additionally, the assignment unit 24 determines whether or not the deadline margin time is equal to or greater than the reference time, and in the case where the deadline margin time is shorter than the reference time, the assignment unit 24 assigns the grouped tasks as a whole before a task earlier in the order than the grouped tasks.

In this way, the assignment unit 24 assigns all of the planning target tasks to create a provisional plan.

In the example illustrated in FIG. 3, the assignment unit 24 assigns tasks sequentially from the 1st task. Additionally, FIG. 3 illustrates an example in which the deadline margin time calculated by assigning the grouped 7th to 10th tasks is shorter than the reference time, and therefore the assignment unit 24 assigns the grouped 7th to 10th tasks before the 6th task earlier in the order, thereby causing the deadline margin time to be equal to or greater than the reference time.

Note that every time a task is assigned, the assignment unit 24 determines whether or not the deadline margin time is equal to or greater than the reference time, and in the case where the deadline margin time is shorter than the reference time, the assignment unit 24 assigns the task before a task earlier in the order than the assigned task. In other words, the assignment unit 24 treats the deadline margin time as a constraint condition, and determines whether to maintain the assignment of a task or moving a task earlier in the order depending on whether or not the constraint condition is satisfied. The constraint condition is not limited to the deadline margin time. For example, the assignment unit 24 may also treat the target work completion date and time of a task as a constraint condition. In other words, after assigning a task to a resource without considering the target work completion date and time, the assignment unit 24 may move a task earlier in the order in the case where the work completion date and time of the assigned task exceeds a specified target work completion date and time.

(Calculation Unit 25)

Figure 4:
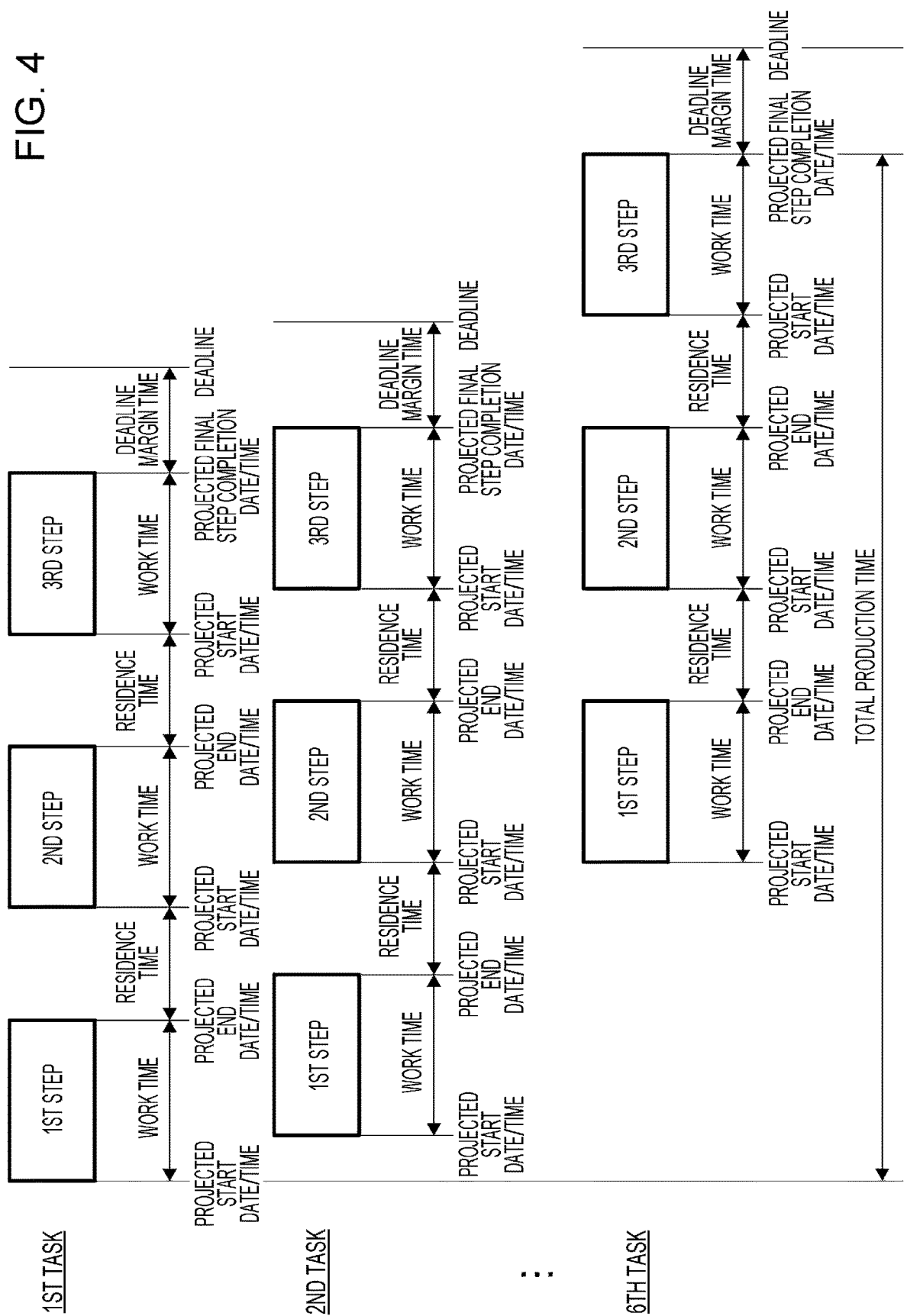
FIG. 4 is a diagram illustrating an example of deadline margin time, residence time, and total production time.

FIG. 4 is a diagram illustrating an example of deadline margin time, residence time, and total production time.

The calculation unit 25 calculates a KPI for the provisional plan that the assignment unit 24 creates by assigning tasks. The KPI may be the average duty of all printing machines, the average duty of all finishing machines, the average production efficiency of all printing machines, the average production efficiency of all finishing machines, the minimum or average deadline margin time of all planned products, the maximum or average residence time between all planned steps, or the total production time, for example.

FIG. 4 illustrates an example of a case where, in the example illustrated in FIG. 3, the 1st task assigned first by the assignment unit 24 is a task that completes a product by going through a 1st step (for example, a printing step), a 2nd step (for example, a cutting step), and a 3rd step (for example, a binding step), while the 6th task assigned last by the assignment unit 24 is a task that completes a products by going through a 1st step (for example, a printing step), a 2nd step (for example, a cutting step), and a 3rd step (for example, a binding step). Also, in the example illustrated in FIG. 4, the 1st step of the 1st task is the first step in the plan assigned by the assignment unit 24, and the 3rd step of the 6th task is the last step in the plan assigned by the assignment unit 24. In the case of the above plan, the total production time is the amount of time from the projected start date and time of the first step of the plan, or in other words the projected start date and time of the 1st step of the 1st task, to the projected completion date and time of the last step of the plan. Also, as illustrated in FIG. 4, the deadline margin time is the amount of time obtained by subtracting the projected completion date and time of the last step in each task from the deadline for each task (in other words, the projected delivery date and time of the product produced by the task). Also, the residence time is the amount of time obtained by subtracting the projected completion date and time of a previous step before a given step in each task from the projected start date and time of the given step.

The calculation unit 25 calculates the duty of each machine using the following Expression (1).

$$\text{Duty (\%)} = \text{time each machine spends working/running time} \times 100 \quad (1)$$

Note that the time each machine spends working (hereinafter referred to as the "work time" in some cases) may be the actual work time (for example, the time actually spent printing in the case of a printing machine or the time actually spent cutting in the case of a cutting machine) plus preparation time (for example, the time spent on preparations such as replacing ink and toner in the case of a printing machine or the time spent on preparations such as replacing blades in the case of a cutting machine).

Also, the calculation unit 25 calculates the production efficiency of each printing machine using the following Expression (2).

$$\text{Production efficiency of each printing machine (pages/hr)} = \text{projected number of pages to produce/running time} \quad (2)$$

Also, the calculation unit 25 calculates the production efficiency of each finishing machine using the following Expression (3).

$$\text{Production efficiency of each finishing machine (copies/hr)} = \text{projected number of copies to output/running time} \quad (3)$$

Also, the calculation unit 25 calculates the deadline margin time using the following Expression (4).

$$\text{Deadline margin time (hrs)} = \text{deadline} - \text{projected completion time of last step} \quad (4)$$

Also, the calculation unit 25 calculates the residence time using the following Expression (5).

$$\text{Residence time (hrs)} = \text{(projected start time of given step in a task)} - \text{(projected completion time of previous step before given step in the task)} \quad (5)$$

Also, the calculation unit 25 calculates the total production time using the following Expression (6).

$$\text{Total production time (min)} = \text{time from projected start date and time of first planned step to projected completion date and time of last planned step} \quad (6)$$

The calculation unit 25 calculates multiple KPIs specified by the user. Hereinafter, the multiple KPIs specified by the user are assumed to be the average duty of all printing machines (hereinafter referred to as the "printing machine duty" in some cases), the average production efficiency of all printing machines (hereinafter referred to as the "printing machine production efficiency" in some cases), the minimum deadline margin time (hereinafter referred to as the "deadline margin time" in some cases), the average value of the residence time (hereinafter referred to as the "average residence time" in some cases), and the total production time. Note that the KPIs specified by the user are not limited to the printing machine duty, the printing machine production efficiency, the deadline margin time, the average residence time, and the total production time.

The calculation unit 25 also determines whether or not each of the multiple calculated KPIs is a more favorable value than a KPI stored in the storage unit 14. For example, in the case where the KPI is the printing machine duty or the finishing machine duty, it is determined whether or not the calculated KPI is smaller than the KPI stored in the storage unit 14. For example, in the case where the KPI is the printing machine production efficiency or the finishing machine production efficiency, it is determined whether or not the calculated KPI is larger than the KPI stored in the storage unit 14. For example, in the case where the KPI is the deadline margin time, it is determined whether or not the calculated KPI is larger than the KPI stored in the storage unit 14. For example, in the case where the KPI is the average residence time, it is determined whether or not the calculated KPI is smaller than the KPI stored in the storage unit 14. For example, in the case where the KPI is the total production time, it is determined whether or not the calculated KPI is smaller than the KPI stored in the storage unit 14. Additionally, in the case where the calculated KPI is the more favorable value, the calculation unit 25 stores the KPI in the storage unit 14 and also stores the plan created by assignment in the storage unit 14.

In this way, after the provisional order determination unit 22 determines a first provisional order, the correction unit 23 corrects the first provisional order to set a corrected provisional order, the assignment unit 24 assigns tasks to resources, and the calculation unit 25 calculates the KPI for the provisional plan assigned by the assignment unit 24. Additionally, in the case where the KPI calculated by the calculation unit 25 is a more favorable value than the KPI stored in the storage unit 14, the calculation unit 25 stores the KPI and the plan assigned by the assignment unit 24 in association with each other in the storage unit 14.

(Creation Unit 26)

The creation unit 26 determines whether or not a predetermined end condition is established. The end condition may be that a predetermined number (for example, 10,000) KPIs have been calculated, that the elapsed time since the start of the process has reached a predetermined length of time (for example, three hours), or that the provisional order determination unit 22 has finished determining all provisional orders, for example. Additionally, in the case where the end condition is established, the creation unit 26 treats the assignment having the most favorable KPI stored in the storage unit 14 as a candidate plan.

On the other hand, in the case where the end condition is not established, the creation unit 26 instructs the provisional order determination unit 22 to determine the next provisional order.

In the example illustrated in FIG. 3, the creation unit 26 instructs the provisional order determination unit 22 to determine the next provisional order, thereby causing the provisional order determination unit 22 to determine an order different from the order of the 11th task, 3rd task, 6th task, and 7th task for which the previous KPI was calculated as the provisional order.

Hereinafter, a production plan creation process performed by the control unit 10 will be described using a flowchart.

Figure 5:
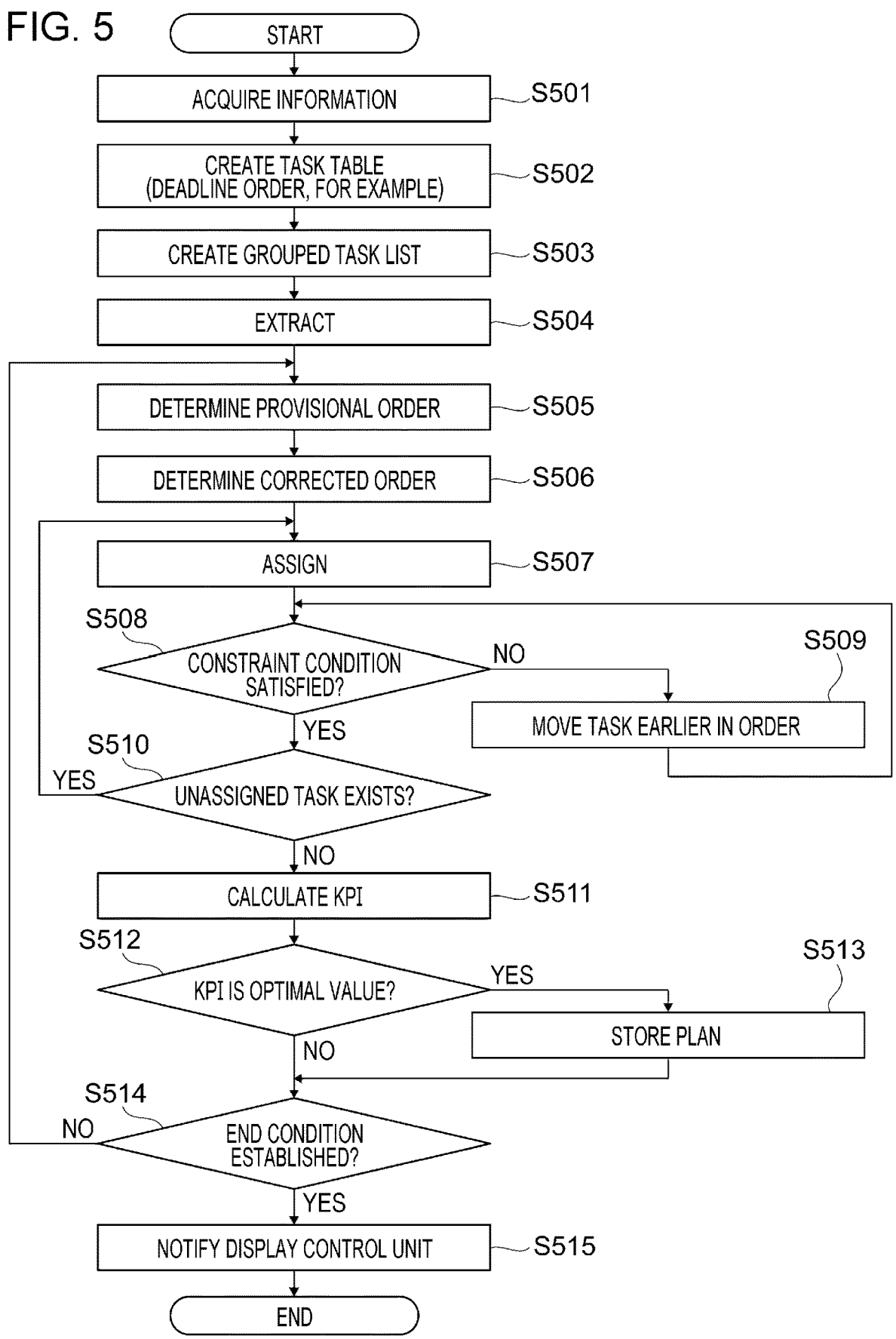
FIG. 5 is a flowchart illustrating one example of a process by the control unit.

FIG. 5 is a flowchart illustrating one example of a process performed by the control unit 10. The control unit 10 executes the process upon receiving an instruction from the user. The control unit 10 receives the instruction from the user through the operation unit 16 and the display unit 15, for example.

First, the control unit 10 acquires various information, such as information about the planning target tasks, machine operation information, information about the work times of workers, information related to grouping, and information about already-assigned tasks (S501).

The control unit 10 creates a task table in which the planning target tasks acquired in S501 are arranged according to a condition specified in advance (S502). The condition specified in advance may be the order of earliest deadline or the order of shortest deadline margin time, for example. Note that in the example illustrated in FIG. 3, the order created by the process in S502 is an order arranged by deadline.

Thereafter, the control unit 10 creates a list of tasks to group together from grouping-related information specified by the user (S503). For example, in the case where "group tasks by customer" is specified, multiple tasks for the same customer are grouped. Note that in the example illustrated in FIG. 3, the 3rd to 5th tasks and the 7th to 10th tasks are grouped by the process in S503.

Thereafter, the control unit 10 extracts tasks from all of the planning target tasks, excluding already-assigned tasks and grouped tasks other than the task at the front of the group. Note that FIG. 3 illustrates an example in which the 3rd task, the 6th task, the 7th task, and the 11th task are extracted by the process in S504.

The process from S501 to S504 described above is the process performed by the extraction unit 21.

Thereafter, the control unit 10 arranges the multiple tasks extracted by the process in S504 according to a predetermined method to determine a provisional order (S505). This process is the process performed by the provisional order determination unit 22.

Thereafter, the control unit 10 corrects the provisional order determined in S505 to determine a corrected provisional order (S506). In other words, the control unit 10 adds already-assigned tasks to the front of the provisional order. The control unit 10 also inserts grouped tasks other than the task at the front of the group after the task at the front of the group. This process is the process performed by the correction unit 23.

Thereafter, the control unit 10 assigns the planning target tasks to machines and workers according to the corrected provisional order determined in S506 (S507). Additionally, the control unit 10 determines whether or not a constraint condition is satisfied (S508). For example, in the case where the constraint condition is that the deadline margin time is equal to or greater than the reference time, the control unit 10 determines whether or not the deadline margin time of a task assigned in S507 is equal to or greater than the reference time. Additionally, the constraint condition is determined to be satisfied in the case where the deadline margin time is equal to or greater than the reference time, and is determined not to be satisfied in the case where the deadline margin time is less than the reference time.

In the case where the constraint condition is not satisfied (S508, NO), the control unit 10 moves the task assigned in S507 earlier in the order (S509), and performs the process from S508. For example, FIG. 3 illustrates an example in which the deadline margin time calculated by assigning the 7th to 10th tasks is shorter than the reference time, and therefore the control unit 10 assigns the grouped 7th to 10th tasks before the 6th task earlier in the order. In such a case, the previous assignment of the 6th task is removed. On the other hand, in the case where the constraint condition is satisfied (S508, YES), the control unit 10 determines whether or not an unassigned task exists among the tasks in the corrected provisional order determined in S506 (S510). In the case where an unassigned task exists (S510, YES), the control unit 10 performs the process from S507. In the case where an unassigned task does not exist (S510, NO), the control unit 10 performs the process from S511.

The process from S507 to S510 described above is the process performed by the assignment unit 24.

In S511, the control unit 10 calculates the multiple KPIs specified in advance for the provisional plan for which assignment is complete (S511). Additionally, the calculation unit 25 determines whether or not each of the multiple KPIs calculated in S511 is a more favorable value than a KPI stored in the storage unit 14 (S512). In the case where the calculated KPI is the more favorable value (S512, YES), the control unit 10 stores the KPI in the storage unit 14 and also stores the provisional plan created by assigning the tasks in the storage unit 14 (S513).

The process from S511 to S513 described above is the process performed by the calculation unit 25.

In the case where the calculated KPI is not the more favorable value (S512, NO), and also in the case after storing the calculated KPI and the like in the storage unit (S513), the control unit 10 determines whether or not a predetermined end condition is established (S514). In the case where the end condition is not established (S514, NO), the control unit 10 performs the process from S505. On the other hand, in the case where the end condition is established (S514, YES), the control unit 10 notifies the display control unit 27 that the end condition is established (S515).

The process of S514 and S515 described above is the process performed by the creation unit 26.

(Display Control Unit 27)

Figure 6:
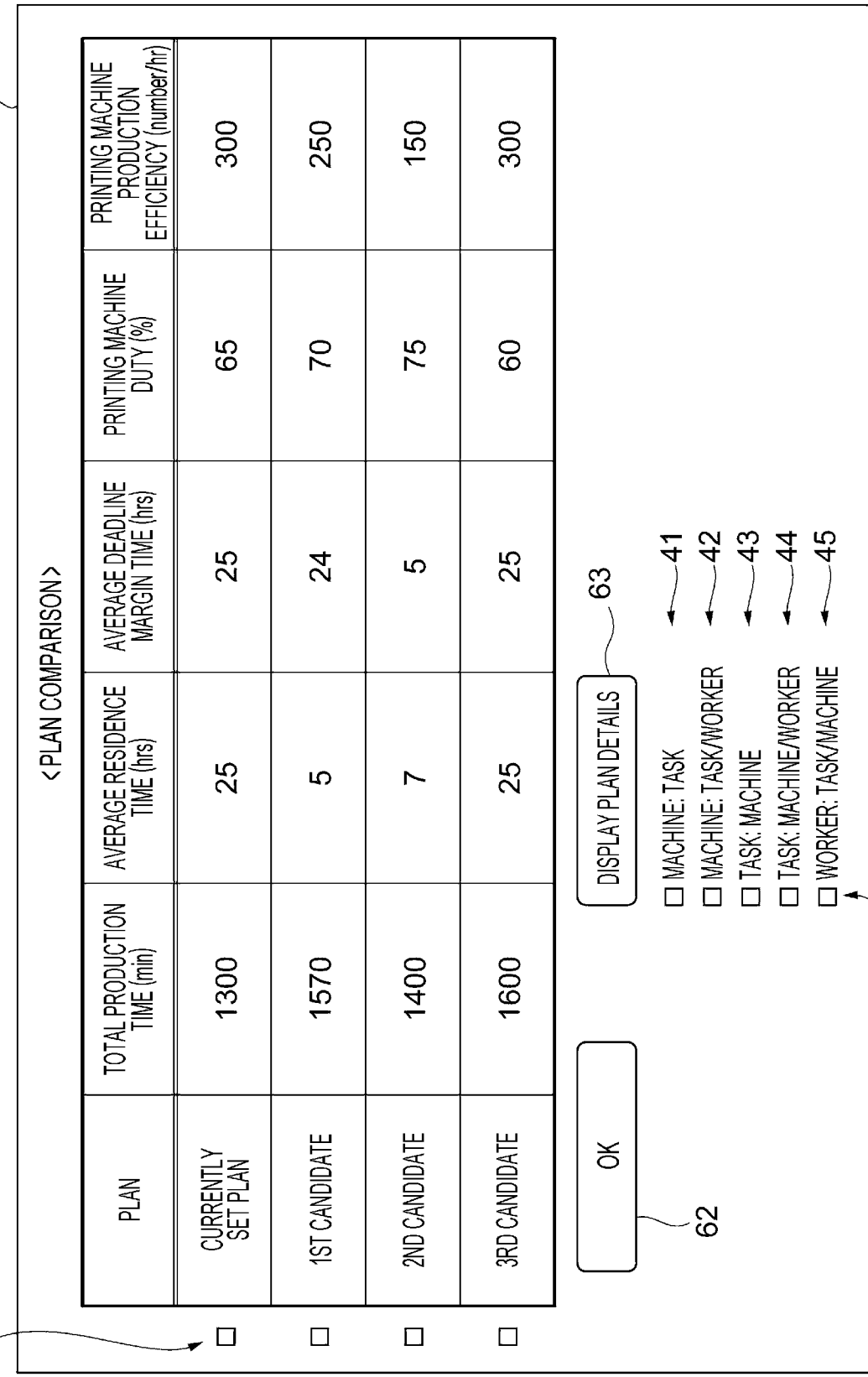
FIG. 6 is a diagram illustrating one example of a comparison screen displayed on the display screen of the display unit by the display control unit.

FIG. 6 is a diagram illustrating one example of a comparison screen 60 displayed on the display screen of the display unit 15 by the display control unit 27.

The display control unit 27 outputs data to be displayed on the display screen of the display unit 15, and controls the display of the display screen.

The display control unit 27 causes the provisional plan having the most favorable KPI for the evaluation indicator specified by the user as the highest priority evaluation indicator (for example, the total production time, the average residence time, the deadline margin time, or the printing machine duty) from among the multiple KPIs stored in the storage unit 14 to be displayed as the candidate plan that is currently set (hereinafter referred to as the "currently set plan" in some cases) on the comparison screen 60. Also, the display control unit 27 causes the provisional plan having the most favorable KPI of the evaluation indicator specified by the user as the second-highest priority evaluation indicator to be displayed as a first candidate of a plan that may be adopted instead of the currently set plan on the comparison screen 60. Also, the display control unit 27 causes the provisional plan having the most favorable KPI of the evaluation indicator specified by the user as the third-highest priority evaluation indicator to be displayed as a second candidate of a plan that may be adopted instead of the currently set plan on the comparison screen 60. Also, the display control unit 27 causes the provisional plan having the most favorable KPI of the evaluation indicator specified by the user as the fourth-highest priority evaluation indicator to be displayed as a third candidate of a plan that may be adopted instead of the currently set plan on the comparison screen 60.

For example, assume that among the multiple KPIs computed by the calculation unit 25, namely the total production time, the printing machine duty, the printing machine production efficiency, the deadline margin time, and the average residence time, the total production time is specified as the KPI of the evaluation indicator having the highest priority, the average residence time is specified as the KPI of the evaluation indicator having the second-highest priority, the deadline margin time is specified as the KPI of the evaluation indicator having the third-highest priority, and the printing machine duty is specified as the KPI of the evaluation indicator having the fourth-highest priority. In such a case, the display control unit 27 causes the provisional plan stored in the storage unit 14 as the plan having the most favorable total production time as one example of an evaluation value to be displayed as the currently set plan. Additionally, the display control unit 27 causes the provisional plan stored in the storage unit 14 as the plan having the most favorable average residence time as one example of an evaluation value to be displayed as the first candidate, causes the provisional plan stored in the storage unit 14 as the plan having the most favorable deadline margin time as one example of an evaluation value to be displayed as the second candidate, and causes the provisional plan stored in the storage unit 14 as the plan having the most favorable printing machine duty as one example of an evaluation value to be displayed as the third candidate on the display unit 15. Furthermore, as illustrated in FIG. 6, the display control unit 27 also causes not only the most favorable KPI but also the other KPIs to be displayed for the currently set plan, the first candidate, the second candidate, and the third candidate. Furthermore, as illustrated in FIG. 6, the display control unit 27 may also cause KPI values calculated by the calculation unit 25 for evaluation indicators other than the highest priority evaluation indicator, the second-highest priority evaluation indicator, the third-highest priority evaluation indicator, and the fourth-highest priority evaluation indicator to be displayed.

Also, the display control unit 27 causes a selection field 61 enabling the selection of one of the currently set plan, the first candidate, the second candidate, and the third candidate to be displayed to the left of each of "Currently Set Plan", "First Candidate", "Second Candidate", and "Third Candidate" on the comparison screen 60 displayed on the display unit 15. In addition, the display control unit 27 causes a confirmation image 62 labeled "OK" for receiving an instruction confirming one of the currently set plan, the first candidate, the second candidate, and the third candidate to be displayed on the comparison screen 60.

In addition, the display control unit 27 causes a detailed display image 63 labeled "Display Plan Details" for receiving an instruction to display details about the currently set plan, the first candidate, the second candidate, and the third candidate to be displayed on the comparison screen 60. In the case where the detailed display image 63 is specified, the display control unit 27 causes details about the currently set plan, the first candidate, the second candidate, and the third candidate to be displayed on the display screen of the display unit 15 in a predetermined display format described below. The predetermined display format may be a table displaying a time allocation of tasks with respect to each machine (hereinafter referred to as the "first detailed table" in some cases), a table displaying a time allocation of tasks and workers with respect to each machine (hereinafter referred to as the "second detailed table" in some cases), a table displaying a time allocation of machines with respect to each task (hereinafter referred to as the "third detailed table" in some cases), a table displaying a time allocation of machines and workers with respect to each task (hereinafter referred to as the "fourth detailed table" in some cases), and a table displaying a time allocation of tasks and machines with respect to each worker (hereinafter referred to as the "fifth detailed table" in some cases), for example. Additionally, to enable the user to select which of the first detailed table to the fifth detailed table is to be displayed, a first explanatory image 41 labeled "Machine: Task" indicating the content of the first detailed table, a second explanatory image 42 labeled "Machine: Task/Worker" indicating the content of the second detailed table, a third explanatory image 43 labeled "Task: Machine" indicating the content of the third detailed table, a fourth explanatory image 44 labeled "Task: Machine/Worker" indicating the content of the fourth detailed table, and a fifth explanatory image 45 labeled "Worker: Task/Machine" indicating the content of the fifth detailed table are displayed together with a selection field 46 displayed to the left of each of the images. Note that the case where the detailed display image 63 is specified may be when the left button of a mouse is pressed while a cursor is positioned over the detailed display image 63, or in other words when the detailed display image 63 is clicked, or when a finger is used to press the detailed display image 63 displayed on a touch panel, for example. Otherwise, the case where the detailed display image 63 is specified may be when a finger is used to touch the detailed display image 63 displayed on a touch panel, or when a confirmation button is pressed (such as by pressing the Enter key on a keyboard) while the detailed display image 63 is in a selected state (such as while the detailed display image 63 is highlighted), for example. However, the configuration is not limited to the above, and the detailed display image 63 may also be selected according to another method. Hereinafter, the same also applies to the case where another image (for example, the confirmation image 62) is specified.

Figure 7:
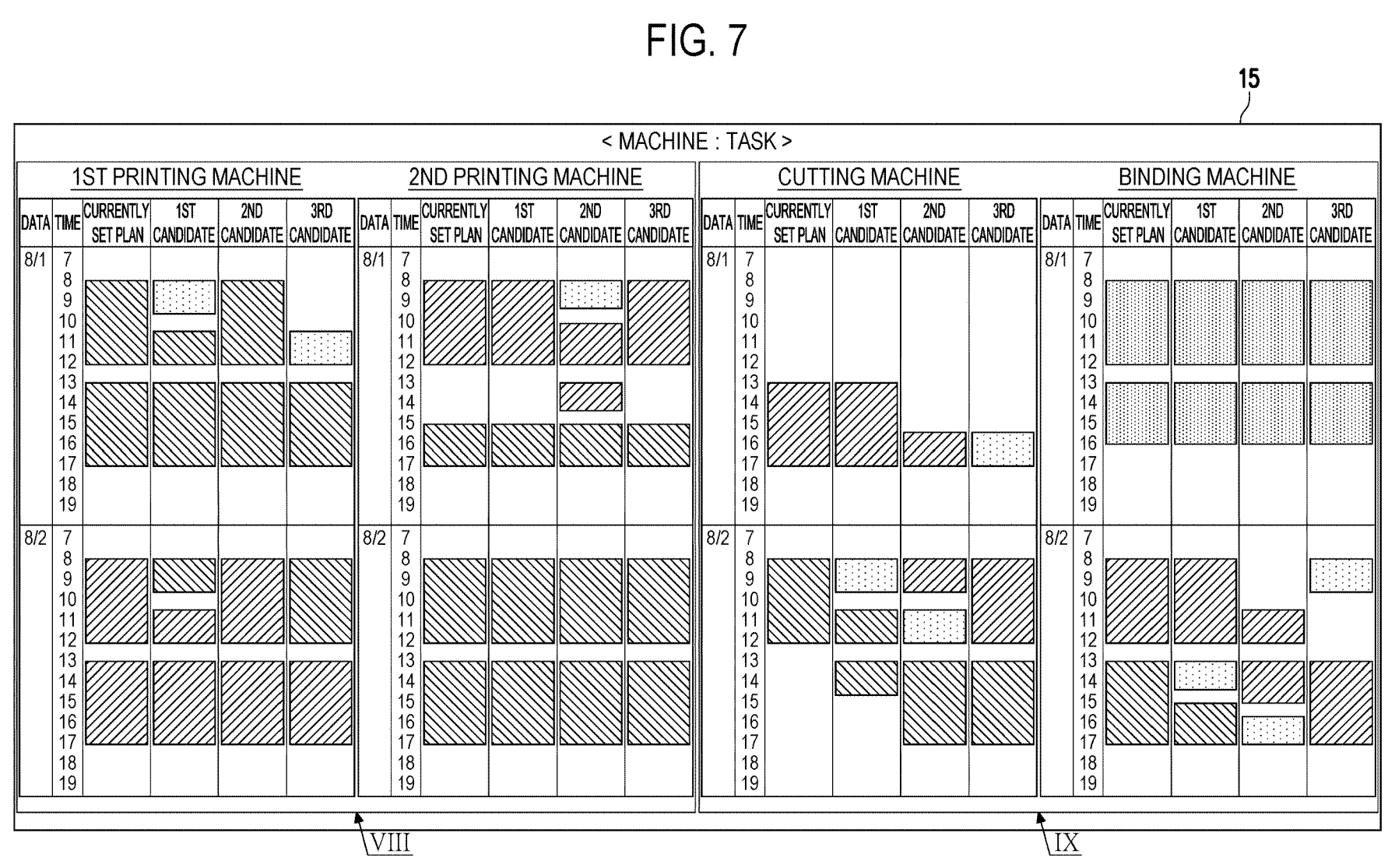

FIG. 7 illustrates an example of the first detailed table. Note that FIG. 7 is a simplified illustration of a plan for only two days.

Figure 8:
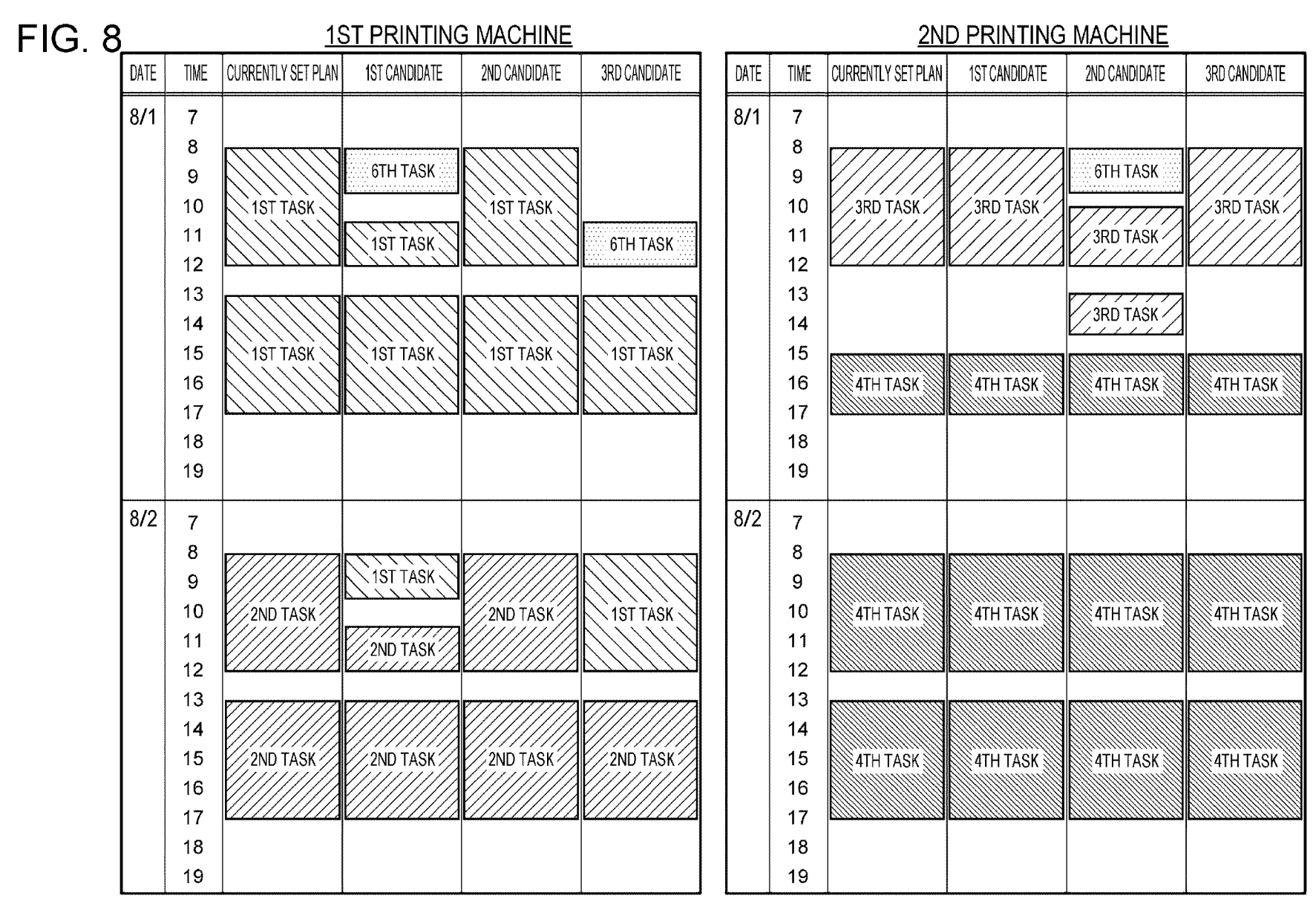
Figure 9:
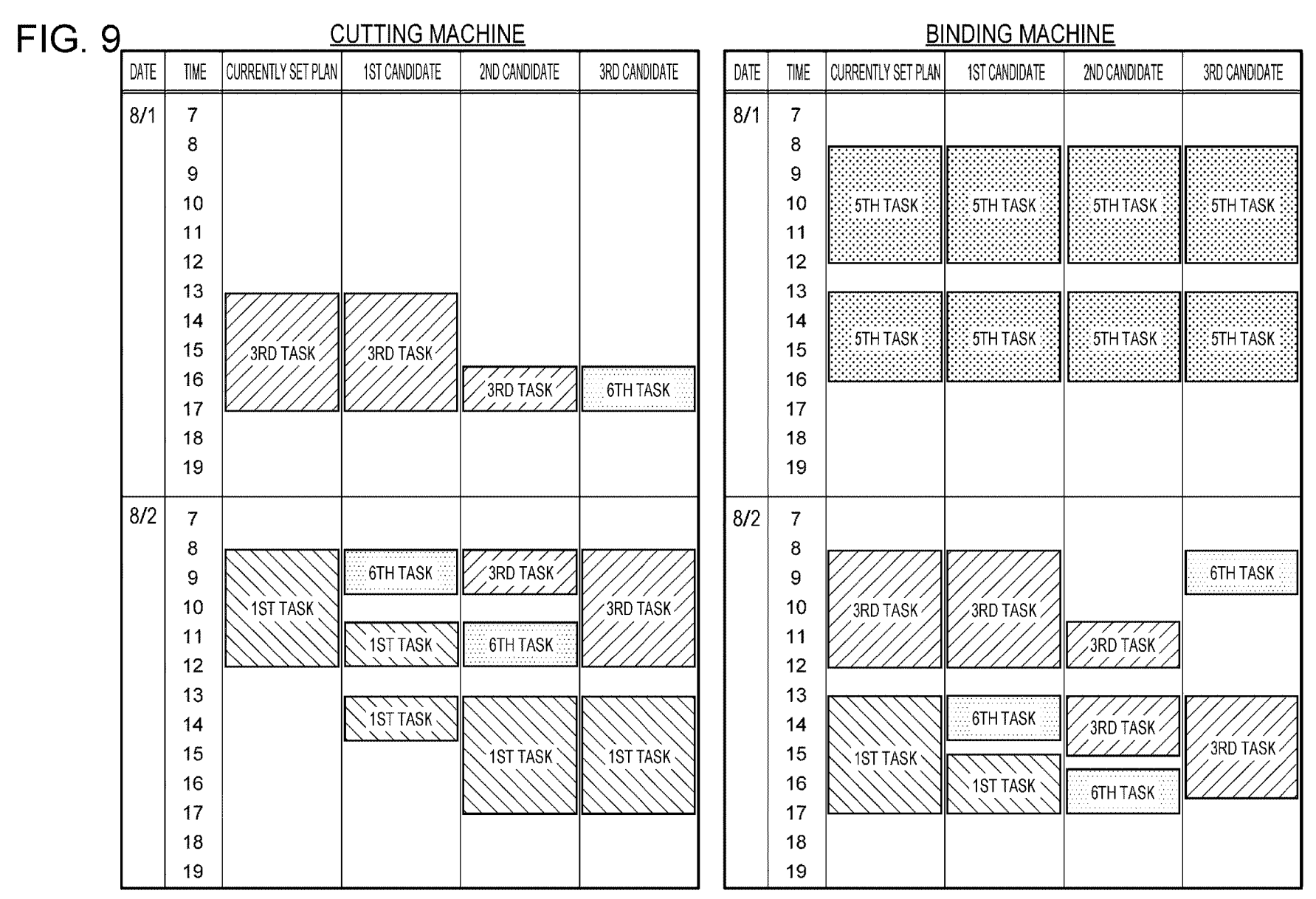

FIG. 8 is an enlarged view of the portion VIII in FIG. 7.
FIG. 9 is an enlarged view of the portion IX in FIG. 7.

The display control unit 27 causes the first detailed table to be displayed in the case where the detailed display image 63 is specified while a mark indicating selection (such as a check mark, for example) is displayed in the selection field 46 to the left of the first explanatory image 41.

As illustrated in FIGS. 7, 8, and 9, the display control unit 27 causes a time allocation of tasks in the currently set plan, the first candidate, the second candidate, and the third candidate to be displayed alongside each other for each machine as the first detailed table.

Figure 10:
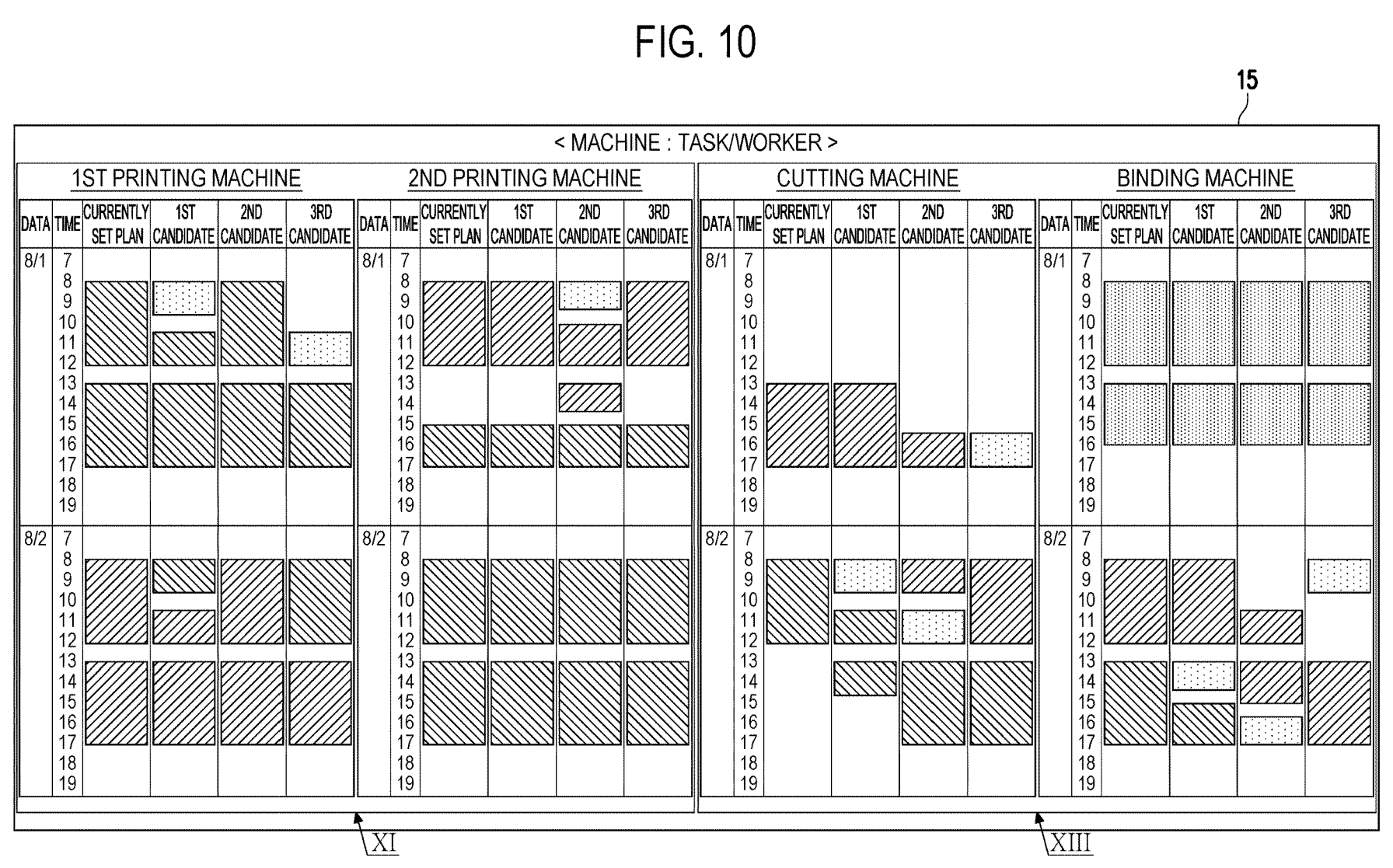

FIG. 10 illustrates an example of the second detailed table. Note that FIG. 10 is a simplified illustration of a plan for only two days.

Figure 11:
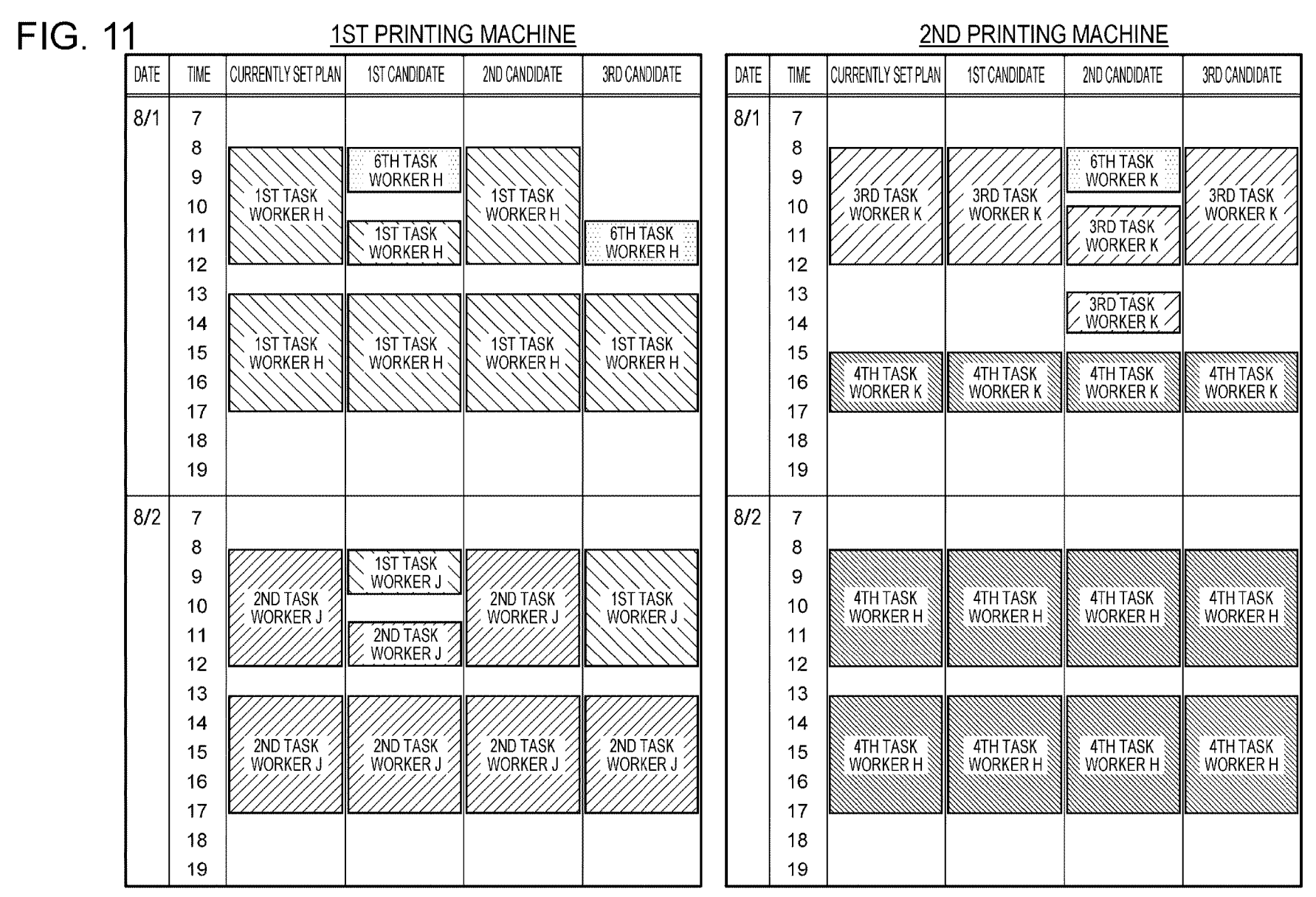

FIG. 11 is an enlarged view of the portion XI in FIG. 10.

FIG. 12 is an enlarged view of the portion XII in FIG. 10.

The display control unit 27 causes the second detailed table to be displayed in the case where the detailed display image 63 is specified while a mark indicating selection is displayed in the selection field 46 to the left of the second explanatory image 42.

As illustrated in FIGS. 10, 11, and 12, the display control unit 27 causes a time allocation of tasks and workers in the currently set plan, the first candidate, the second candidate, and the third candidate to be displayed alongside each other for each machine as the second detailed table.

Figure 13:
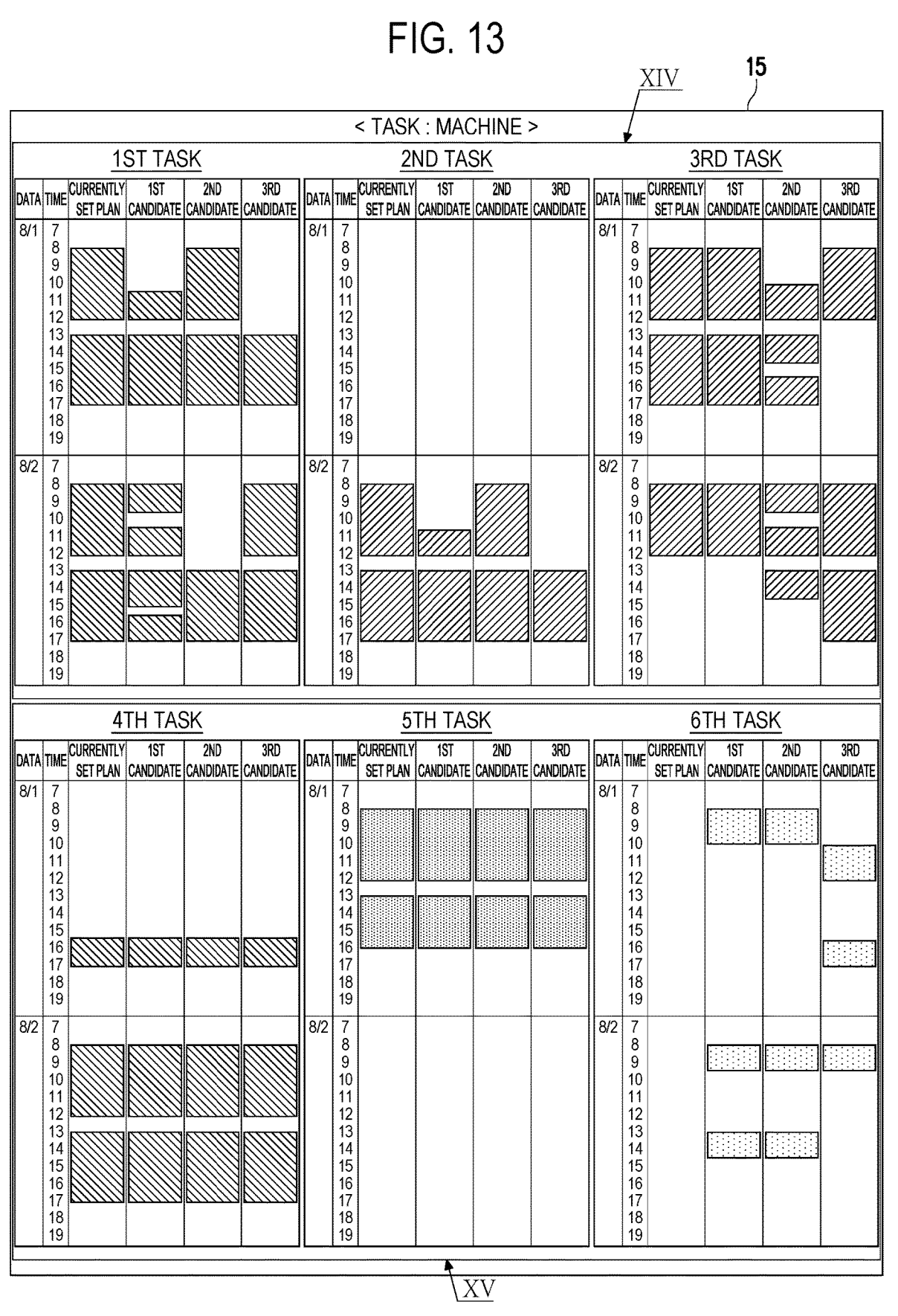

FIG. 13 illustrates an example of the third detailed table. Note that FIG. 13 is a simplified illustration of a plan for only two days.

Figure 14:
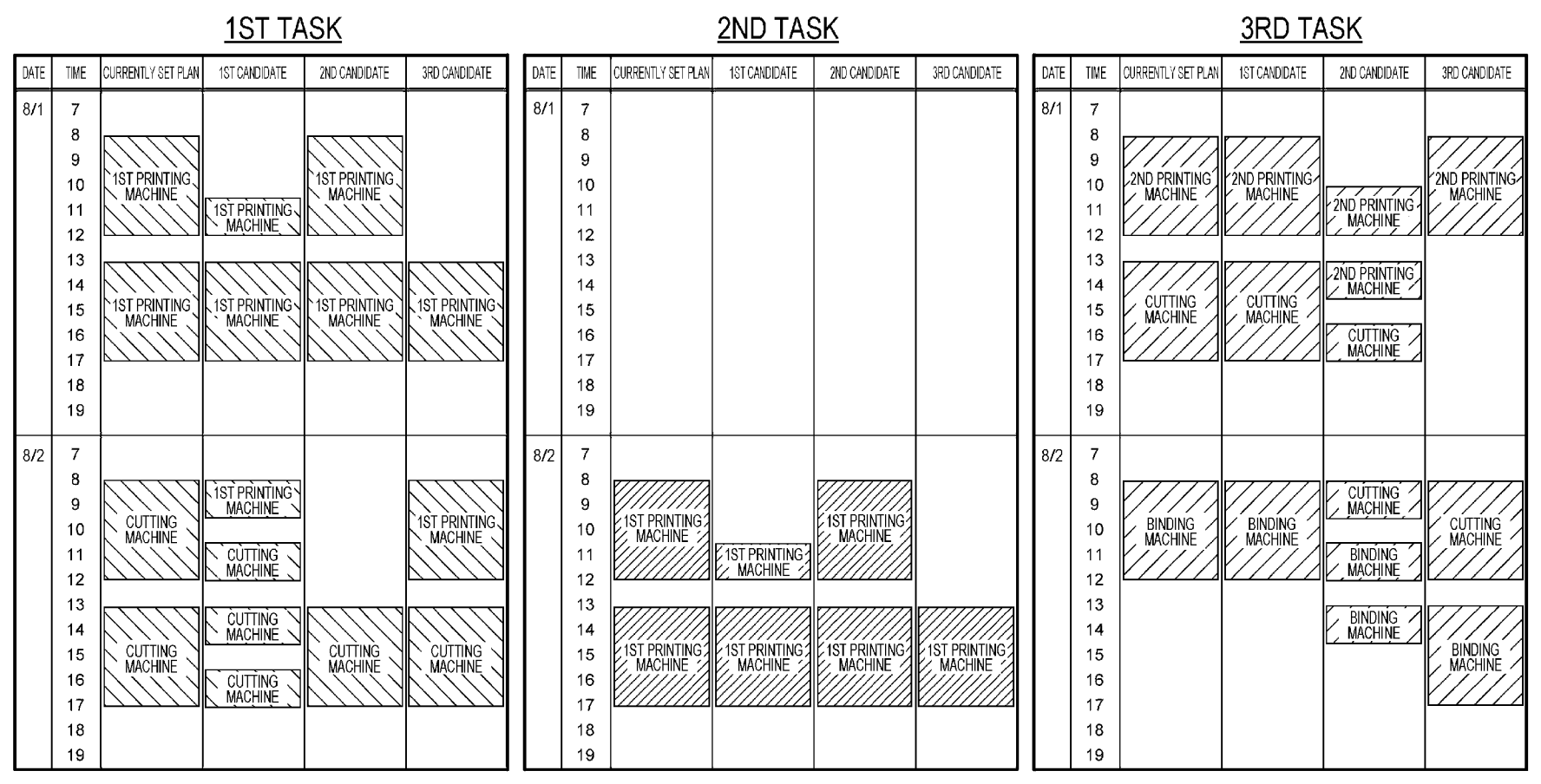

FIG. 14 is an enlarged view of the portion XIV in FIG. 13.

Figure 15:
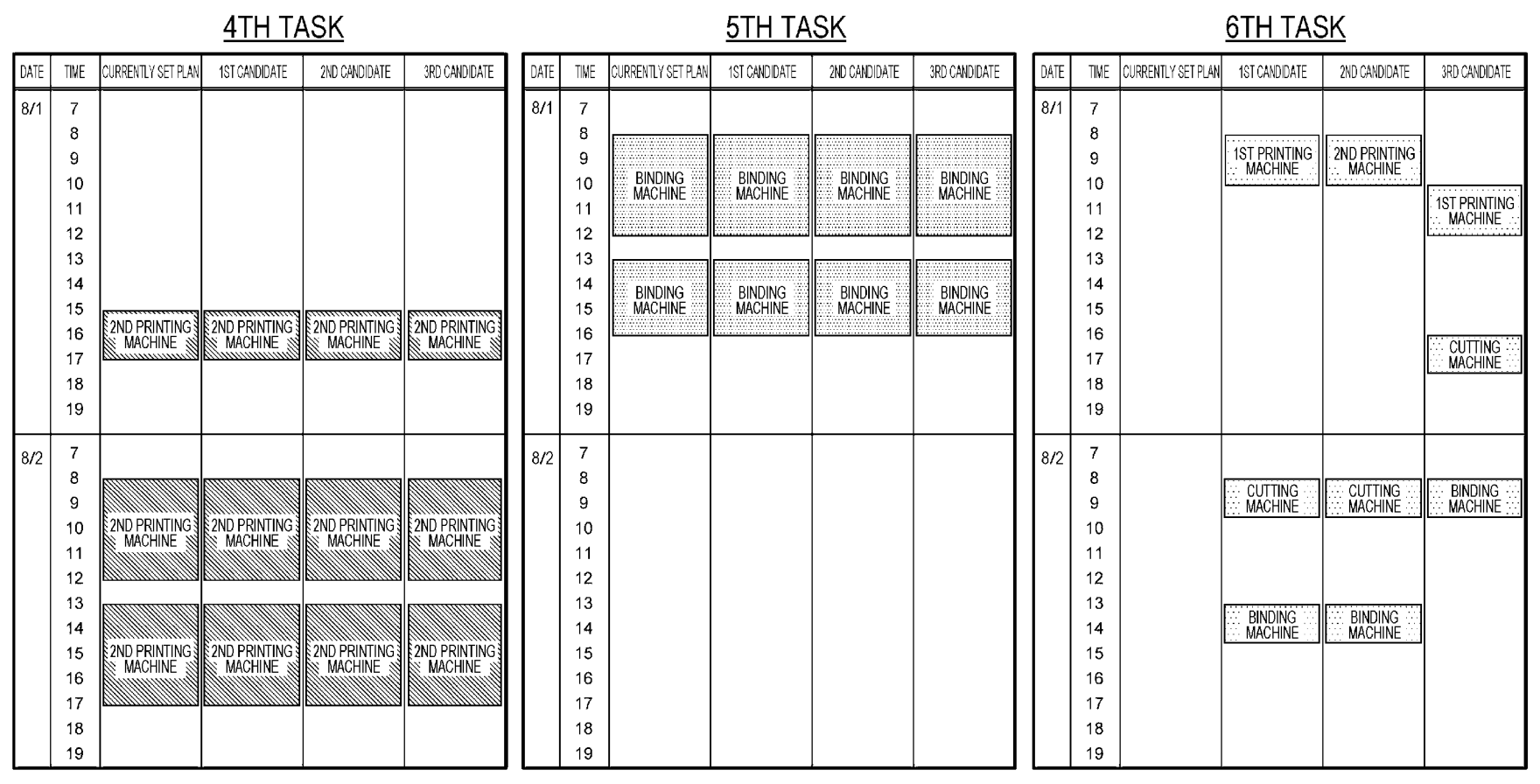

FIG. 15 is an enlarged view of the portion XV in FIG. 13.

The display control unit 27 causes the third detailed table to be displayed in the case where the detailed display image 63 is specified while a mark indicating selection is displayed in the selection field 46 to the left of the third explanatory image 43.

As illustrated in FIGS. 13, 14, and 15, the display control unit 27 causes a time allocation of machines in the currently set plan, the first candidate, the second candidate, and the third candidate to be displayed for each task as the third detailed table.

Figure 16:
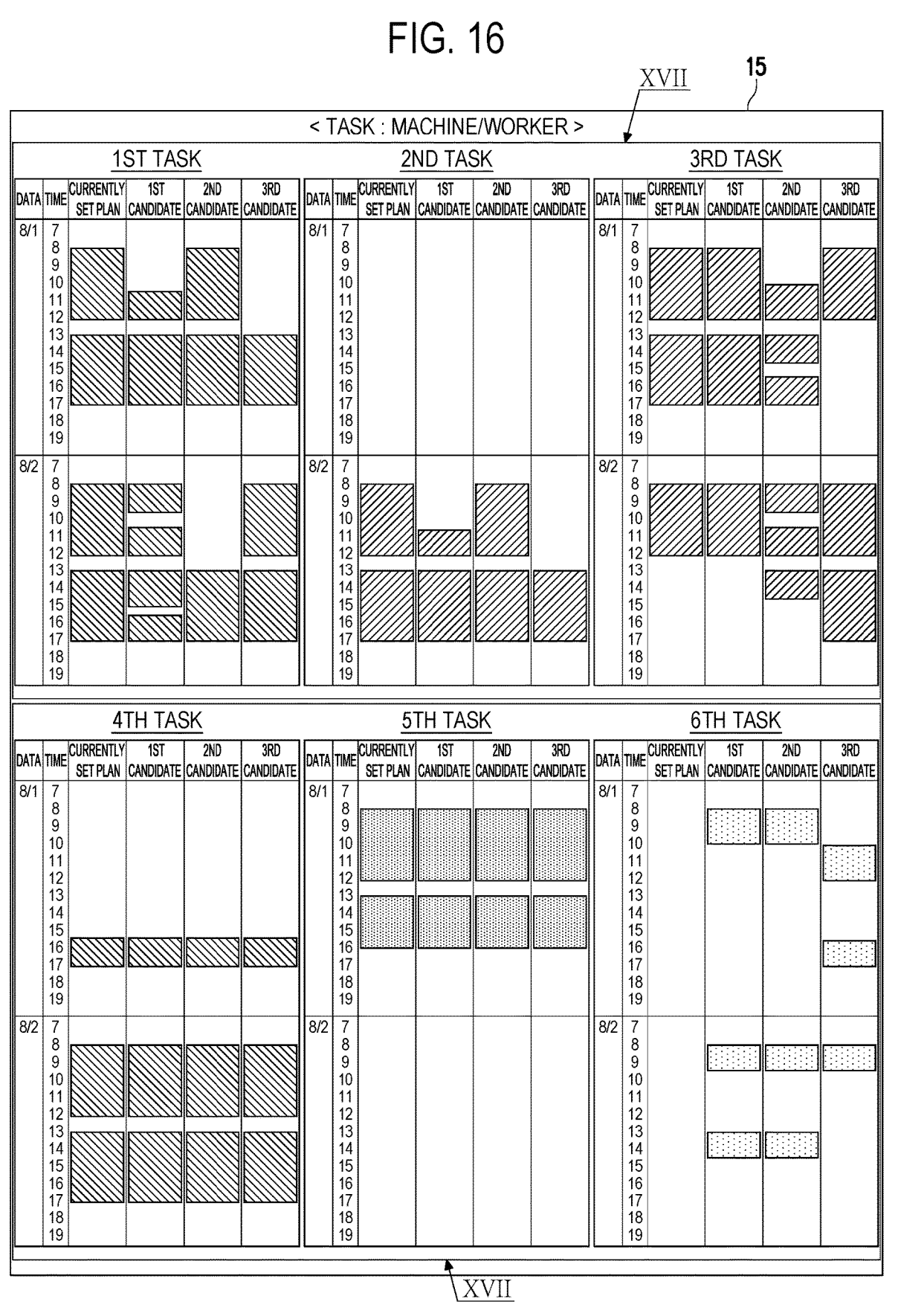

FIG. 16 illustrates an example of the fourth detailed table. Note that FIG. 16 is a simplified illustration of a plan for only two days.

Figure 17:
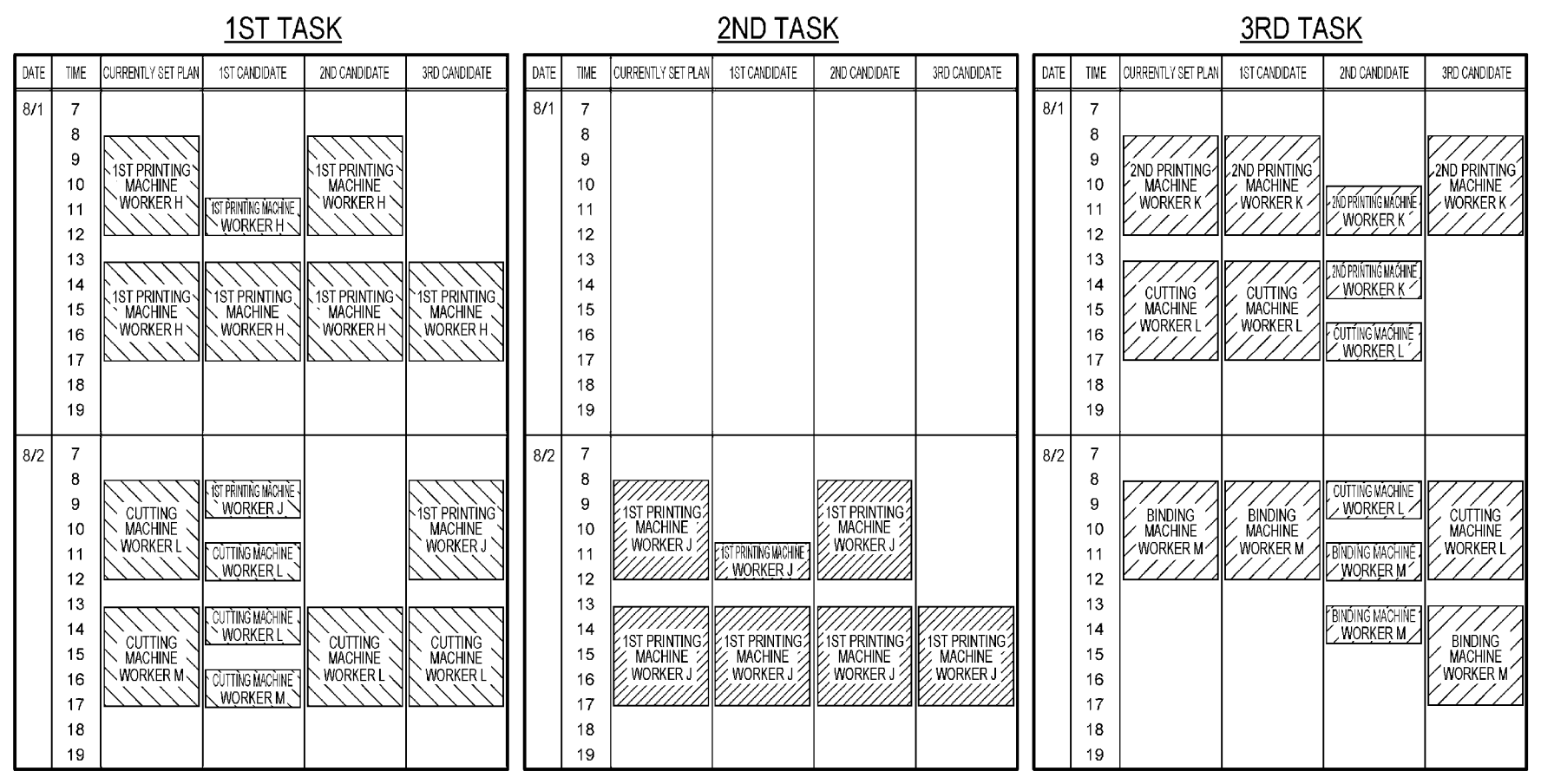

FIG. 17 is an enlarged view of the portion XVII in FIG. 16.

FIG. 18 is an enlarged view of the portion XVIII in FIG. 16.

The display control unit 27 causes the fourth detailed table to be displayed in the case where the detailed display image 63 is specified while a mark indicating selection is displayed in the selection field 46 to the left of the fourth explanatory image 44.

As illustrated in FIGS. 16, 17, and 18, the display control unit 27 causes a time allocation of machines and workers in the currently set plan, the first candidate, the second candidate, and the third candidate to be displayed for each task as the fourth detailed table.

Figure 19:
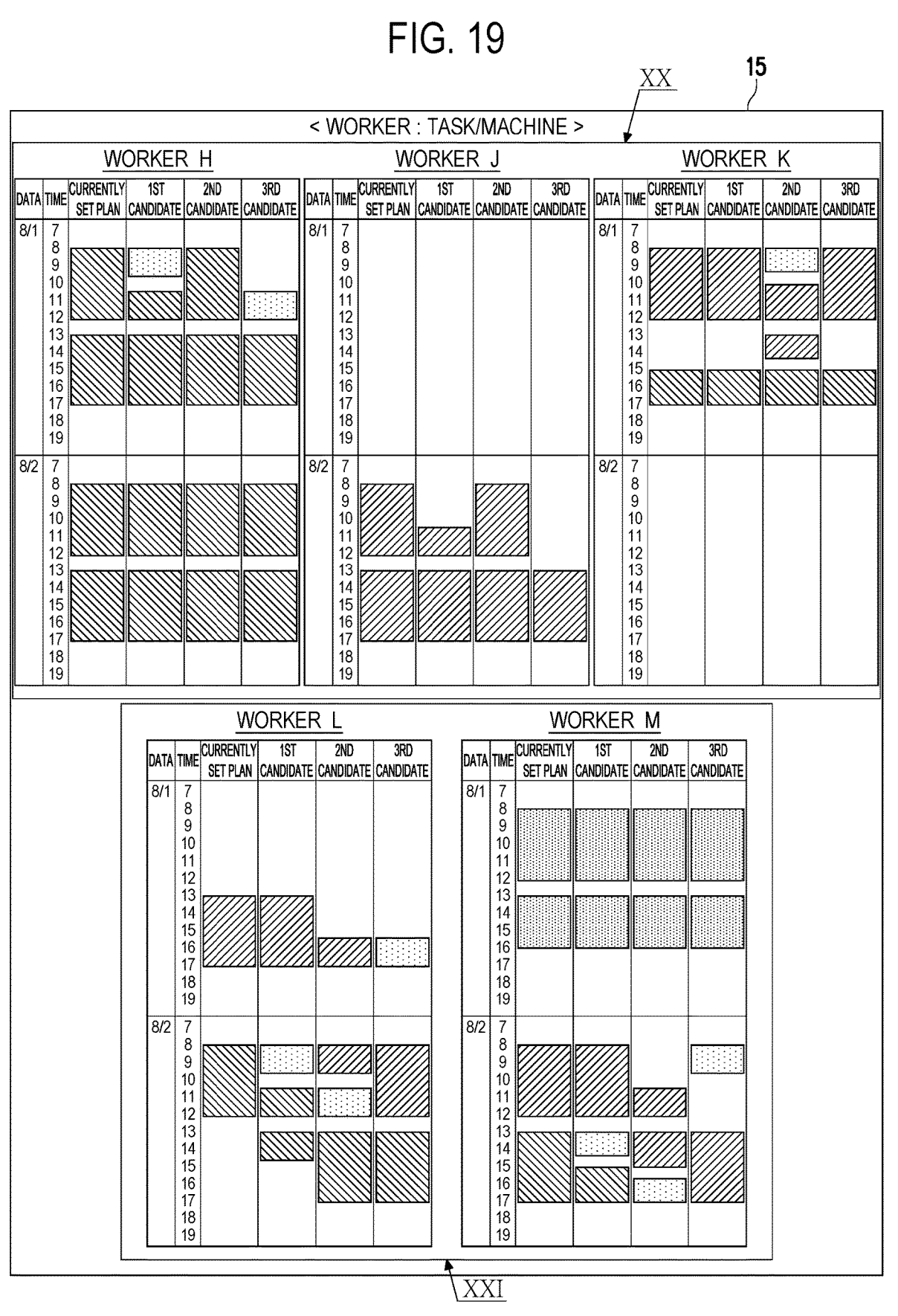

FIG. 19 illustrates an example of the fifth detailed table. Note that FIG. 19 is a simplified illustration of a plan for only two days.

Figure 20:
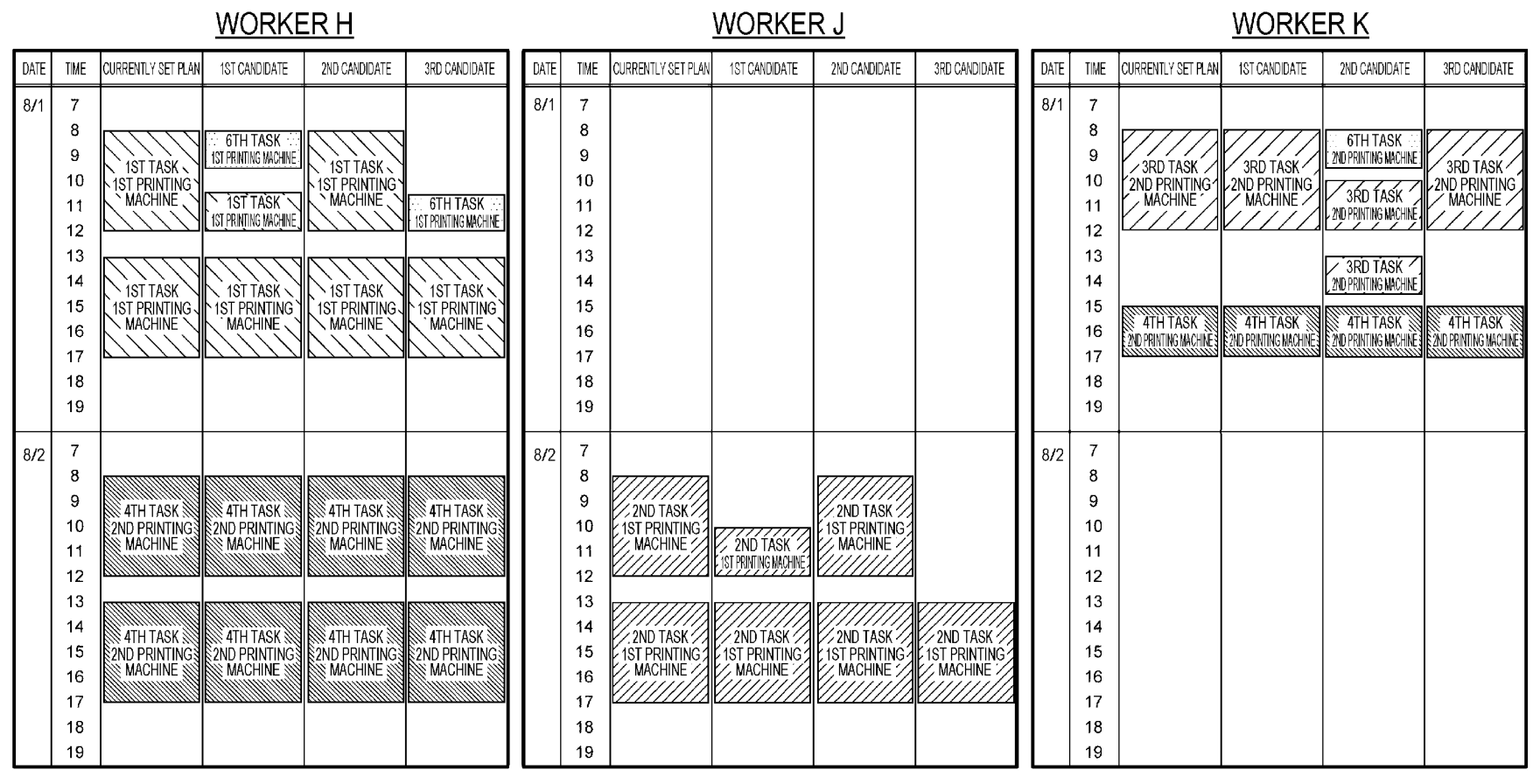

FIG. 20 is an enlarged view of the portion XX in FIG. 19.

Figure 21:
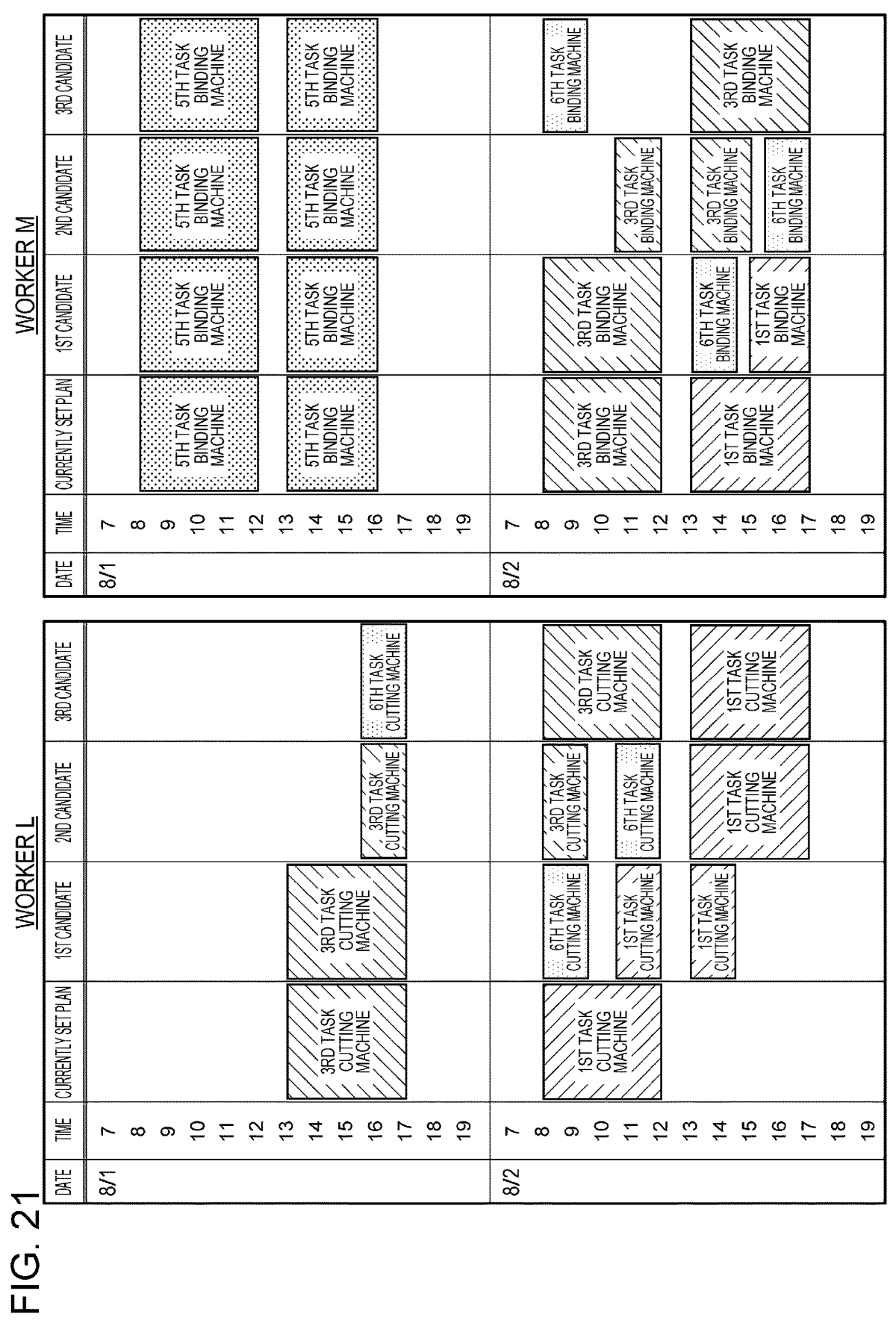

FIG. 21 is an enlarged view of the portion XXI in FIG. 19.

The display control unit 27 causes the fifth detailed table to be displayed in the case where the detailed display image 63 is specified while a mark indicating selection is displayed in the selection field 46 to the left of the fifth explanatory image 45.

As illustrated in FIGS. 19, 20, and 21, the display control unit 27 causes a time allocation of tasks and machines in the currently set plan, the first candidate, the second candidate, and the third candidate to be displayed for each worker as the fifth detailed table.

(Final Determination Unit 28)

In the case where the confirmation image 62 is specified while a mark indicating selection, such as a check mark for example, is displayed in the selection field 61 displayed to the left of each of "Currently Set Plan", "First Candidate", "Second Candidate", and "Third Candidate" on the comparison screen 60 made to be displayed on the display unit 15 by the display control unit 27, the final determination unit 228 determines the selected plan as the final production plan.

In the exemplary embodiment described above, the functions of the control unit 10 are achieved by causing the CPU 11 given as one example of a processor use the RAM 13 as a work area to execute a program or the like loaded from the ROM 12 or the storage unit 14, but the configuration is not particularly limited to the above. For example, the functions of the control unit 10 may also be achieved by using two or more processors. Note that the term "processor" refers to hardware in a broad sense. Examples of the processor include general processors (such as a CPU) and dedicated processors (such as a graphics processing unit (GPU), an application-specific integrated circuit (ASIC), a field-programmable gate array (FPGA), and a programmable logic device).

Additionally, the production plan creation device 1 configured as above includes a processor (for example, the CPU 11), and when creating a plan for multiple tasks performed to produce a product, the processor determines multiple candidate plans (for example, the currently set plan, the plan of the first candidate, the plan of the second candidate, and the plan of the third candidate) having the most favorable value for each of multiple predetermined evaluation indicators (for example, the total production time, the average residence time, the deadline margin time, and the printing machine duty), and causes the multiple candidate plans to be displayed such that the respective evaluation values of the multiple evaluation indicators are comparable. For example, the processor causes the display unit 15 to display the comparison screen 60 illustrated in FIG. 6, in which the currently set plan, the plan of the first candidate, the plan of the second candidate, and the plan of the third candidate having the most favorable value for each of multiple evaluation indicators, namely the total production time, the average residence time, the deadline margin time, and the printing machine duty, such that the values of the total production time, the average residence time, the deadline margin time, and the printing machine duty are comparable. In other words, the processor causes 1300, 25, 25, and 65 which are the values of the total production time, the average residence time, the deadline margin time, and the printing machine duty in the currently set plan to be displayed, and also causes 1570, 5, 24, and 70 which are the values of the total production time, the average residence time, the deadline margin time, and the printing machine duty in the plan of the first candidate to be displayed. Additionally, the processor causes 1400, 7, 5, and 75 which are the values of the total production time, the average residence time, the deadline margin time, and the printing machine duty in the plan of the second candidate to be displayed, and also causes 1600, 25, 25, and 60 which are the values of the total production time, the average residence time, the deadline margin time, and the printing machine duty in the plan of the third candidate to be displayed. With this arrangement, a user such as a person who creates plans at the worksite is able to select a final plan from among the multiple candidate plans while comparing the evaluation values. For example, the user is able to select a final plan while considering the circumstances at the worksite. In other words, under circumstances in which the workers have been working continually for many days with long hours, it is possible to select the plan that minimizes the total production time.

Note that in the exemplary embodiment described above, the calculation unit 25 is made to calculate the five KPIs of the total production time, the printing machine duty, the printing machine production efficiency, the deadline margin time, and the average residence time, but the KPIs are not particularly limited to the above. Also, the display control unit 27 causes the four candidate plans of the currently set plan, the plan of the first candidate, the plan of the second candidate, and the plan of the third candidate to be displayed, but the number of candidate plans is not particularly limited to four. The processor may cause the currently set plan, which is one example of a first candidate plan having the most favorable total production time specified by the user as the highest priority KPI as one example of a predetermined first evaluation indicator, and the plan of the first candidate, which is one example of a second candidate plan having the most favorable average residence time specified by the user as the second-highest priority KPI as one example of a predetermined second evaluation indicator, to be comparably displayed. At the least, the user is able to select a plan suited to the circumstances at the worksite by having the calculation unit 25 calculate the highest priority KPI and the second-highest priority KPI, and also having the display control unit 27 cause the candidate plan having the most favorable value of the highest priority KPI and the candidate plan having the most favorable value of the second-highest priority KPI to be comparably displayed.

Also, the processor causes the average residence time to be displayed together with the total production time in the field of the currently set plan, and causes the total production time to be displayed together with the average residence time in the field of the plan of the first candidate. With this arrangement, the user is able to decide the final plan while comparing the KPIs, such as by not adopting the currently set plan in the case where the currently set plan has a favorable total production time but the average residence time is worse than the average residence time in the plan of the first candidate by more than a predetermined reference value (for example, double the time).

Also, the processor causes the detailed display image 63 as one example of an image for receiving an instruction to display plan tables of multiple candidate plans to be displayed on the comparison screen 60 that causes evaluation values of the multiple candidate plans to be comparably displayed, and in the case where the detailed display image 63 is specified, the processor causes the plan tables of the multiple plans to be comparably displayed, as illustrated in FIGS. 7 to 21. With this arrangement, the user is able not only to compare the evaluation values, but also decide the final plan while comparing the plan tables. Note that the processor is not limited to causing the plan tables to be comparably displayed in the case where the detailed display image 63 is specified. For example, the processor may also cause multiple candidate plans to be displayed such that the respective evaluation values of multiple evaluation indicators are comparable, and also such that the respective plan tables of the multiple candidate plans are comparable.

Each plan table is a correspondence table displaying at least one of a task and a worker who performs the task for each machine, a correspondence table displaying at least one of a machine used in the task and a worker who performs the task for each task, or a correspondence table displaying at least one of a machine that the worker is in charge of and the task that the worker performs for each worker. For example, as illustrated in FIGS. 7, 8, and 9, the processor causes a correspondence table displaying tasks in multiple candidate plans for each machine to be displayed. Also, as illustrated in FIGS. 10, 11, and 12, the processor causes a correspondence table displaying tasks and workers in multiple candidate plans for each machine to be displayed. Also, as illustrated in FIGS. 13, 14, and 15, the processor causes a correspondence table displaying machines in multiple candidate plans for each task to be displayed. Also, as illustrated in FIGS. 16, 17, and 18, the processor causes a correspondence table displaying machines and workers in multiple candidate plans for each task to be displayed. Also, as illustrated in FIGS. 19, 20, and 21, the processor causes a correspondence table displaying tasks and machines in multiple candidate plans for each worker to be displayed. Otherwise, the processor may also cause a correspondence table displaying workers in multiple candidate plans for each machine to be displayed, or cause a correspondence table displaying workers in multiple candidate plans for each task to be displayed. Additionally, the processor may also cause a correspondence table displaying tasks or machines in multiple candidate plans for each worker to be displayed. With this arrangement, the processor is capable of causing a correspondence table to be displayed in which a desired item to focus on most from among machines, tasks, and workers (for example, machines in FIGS. 7, 8, and 9) is treated as primary, and a next-desired item to focus on (for example, tasks in FIGS. 7, 8, and 9) is treated as secondary.

Also, the processor causes the selection field 46 as one example of an image for selecting which correspondence table to display from among multiple correspondence tables to be displayed on the comparison screen 60. With this arrangement, the user is able to select a plan table that treat a desired item to focus on as primary, such as machines, tasks, or workers, making it easier for the user to select a final plan from among multiple candidate plans compared to the case where only a plan table indicating predetermined items is displayed, for example.

Note that in the exemplary embodiment described above, the plan having the most favorable KPI of the highest priority evaluation indicator is displayed as the current set plan, the plan having the most favorable KPI of the second-highest priority evaluation indicator is displayed as the plan of the first candidate that may be adopted instead of the currently set plan, the plan having the most favorable KPI of the third-highest priority evaluation indicator is displayed as the plan of the second candidate that may be adopted instead of the currently set plan, and the plan having the most favorable KPI of the fourth-highest priority evaluation indicator is displayed as the plan of the third candidate that may be adopted instead of the currently set plan, but the display is not particularly limited to the above. For example, the plan having the most favorable KPI of the highest priority evaluation indicator may be displayed as a first candidate plan, the plan having the most favorable KPI of the second-highest priority evaluation indicator may be displayed as a second candidate plan, the plan having the most favorable KPI of the third-highest priority evaluation indicator may be displayed as a third candidate plan, and the plan having the most favorable KPI of the fourth-highest priority evaluation indicator may be displayed as a fourth candidate plan.

Note that a program executed by the CPU 11 of the control unit 10 or the CPU 11 of the control unit 210 may be provided in a recorded state on a computer-readable recording medium, such as a magnetic recording medium (such as magnetic tape or a magnetic disk), an optical recording medium (such as an optical disc), a magneto-optical recording medium, or semiconductor memory. In addition, the program may also be downloaded by using a communication medium such as the Internet.

In addition, a program forming an exemplary embodiment of the present disclosure causes a processor to execute: a function of acquiring information about multiple tasks performed to produce a product using resources; a function of determining a provisional order of two or more tasks among the multiple tasks while accounting for a predetermined condition for performing the multiple tasks; a function of creating a provisional plan in which resources are assigned in an order obtained by correcting the provisional order to account for the condition; and a function of creating a candidate plan on the basis of an evaluation of the provisional plan.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A production plan creation device comprising:
   a processor configured to
   acquire information about a plurality of tasks performed to produce a product by a plurality of machines and a plurality of workers at a site, wherein the plurality of machines comprise a printing machine, a cutting machine, and a binding machine,
   create a plurality of candidate plans having a most favorable evaluation value for each of a plurality of predetermined evaluation indicators according to the acquired information, wherein each of the plurality of candidate plans comprises the plurality of tasks arranged in a different order and performed by the printing machine, the cutting machine, and the binding machine according to a different predetermined condition to finish producing the product before a designated deadline,
   cause the plurality of candidate plans to be displayed and to be selected on a user interface such that respective evaluation values of the plurality of evaluation indicators of each of the plurality of candidate plans are comparable,
   wherein the plurality of candidate plans comprise a first candidate plan and a second candidate plan, the first candidate plan has the most favorable evaluation value of a first evaluation indicator specified as a highest priority evaluation indicator from among the plurality of evaluation indicators, and the second candidate plan has the most favorable evaluation value of a second evaluation indicator specified as a second-highest priority evaluation indicator, and
   wherein the first candidate plan is set as a default plan,
   receive a selection on a final plan among the plurality of candidate plans from a user input on the user interface, wherein the plurality of tasks arranged in the final plan comprise at least one printing task to be performed by the printing machine at a first designated time period, at least one cutting task to be performed by the cutting machine at a second designated time period, and at least one binding task to be performed by the binding machine at a third designated time period, and
   cause the printing machine to perform the at least one printing task at the first designated time period according to the final plan.

2. The production plan creation device according to claim 1, wherein
   the processor is configured to cause the evaluation value of the second evaluation indicator to be displayed together with the evaluation value of the first evaluation indicator in a field of the first candidate plan, and cause the evaluation value of the first evaluation indicator to be displayed together with the evaluation value of the second evaluation indicator in a field of the second candidate plan.

3. The production plan creation device according to claim 2, wherein
   the processor is configured to cause an image for receiving an instruction to display plan tables of the plurality of candidate plans to be displayed on a comparison screen that causes the evaluation values of the plurality of candidate plans to be comparably displayed, and in a case where the image is specified, the processor is configured to cause the plan tables of the plurality of plans to be comparably displayed.

4. The production plan creation device according to claim 3, wherein
   each plan table is a correspondence table displaying at least one of a task and a worker who performs the task for each of the plurality of machines, a correspondence table displaying at least one of a machine used in the task and a worker who performs the task for each of the plurality of tasks, or a correspondence table displaying at least one of a machine that the worker is in charge of and the task that the worker performs for each of the plurality of workers.

5. The production plan creation device according to claim 4, wherein
   the processor is configured to cause an image for selecting which correspondence table to display from among a plurality of correspondence tables to be displayed on the comparison screen.

6. The production plan creation device according to claim 4, wherein the processor is further configured to
   display a detailed display icon on the user interface,
   in response to the detailed display icon being selected, generate and display a table, on the user interface, comprising a time allocation of the plurality of tasks and the plurality of workers with respect to each of the printing machine, the cutting machine, and the binding machine.

7. The production plan creation device according to claim 1, wherein
the processor is configured to cause an image for receiving an instruction to display plan tables of the plurality of candidate plans to be displayed on a comparison screen that causes the evaluation values of the plurality of candidate plans to be comparably displayed, and in a case where the image is specified, the processor is configured to cause the plan tables of the plurality of plans to be comparably displayed.

8. The production plan creation device according to claim 7, wherein
each plan table is a correspondence table displaying at least one of a task and a worker who performs the task for each of the plurality of machines, a correspondence table displaying at least one of a machine used in the task and a worker who performs the task for each of the plurality of tasks, or a correspondence table displaying at least one of a machine that the worker is in charge of and the task that the worker performs for each of the plurality of workers.

9. The production plan creation device according to claim 8, wherein
the processor is configured to cause an image for selecting which correspondence table to display from among a plurality of correspondence tables to be displayed on the comparison screen.

10. A non-transitory computer readable medium storing a program causing a computer to execute a process for creating a production plan, the process comprising:
acquiring information about a plurality of tasks performed to produce a product by a plurality of machines and a plurality of workers at a site, wherein the plurality of machines comprise a printing machine, a cutting machine, and a binding machine;
creating a plurality of candidate plans having a most favorable evaluation value for each of a plurality of predetermined evaluation indicators according to the acquired information, wherein each of the plurality of candidate plans comprises the plurality of tasks arranged in a different order and performed by the printing machine, the cutting machine, and the binding machine according to a different predetermined condition to finish producing the product before a designated deadline;
causing the plurality of candidate plans to be displayed and to be selected on a user interface such that respective evaluation values of the plurality of evaluation indicators of each of the plurality of candidate plans are comparable,
wherein the plurality of candidate plans comprise a first candidate plan and a second candidate plan, the first candidate plan has the most favorable evaluation value of a first evaluation indicator specified as a highest priority evaluation indicator from among the plurality of evaluation indicators, and the second candidate plan has the most favorable evaluation value of a second evaluation indicator specified as a second-highest priority evaluation indicator, and
wherein the first candidate plan is set as a default plan;
receiving a selection on a final plan among the plurality of candidate plans from a user input on the user interface, wherein the plurality of tasks arranged in the final plan comprise at least one printing task to be performed by the printing machine at a first designated time period, at least one cutting task to be performed by the cutting machine at a second designated time period, and at least one binding task to be performed by the binding machine at a third designated time period; and
causing the printing machine to perform the at least one printing task at the first designated time period according to the final plan.

11. A production plan creation device comprising:
information acquisition means for acquiring information about a plurality of tasks performed to produce a product by a plurality of machines and a plurality of workers at a site, wherein the plurality of machines comprise a printing machine, a cutting machine, and a binding machine;
candidate plan determining means for creating a plurality of candidate plans having a most favorable evaluation value for each of a plurality of predetermined evaluation indicators according to the acquired information, wherein each of the plurality of candidate plans comprises the plurality of tasks arranged in a different order and performed by the printing machine, the cutting machine, and the binding machine according to a different predetermined condition to finish producing the product before a designated deadline;
display controlling means for causing the plurality of candidate plans to be displayed and to be selected on a user interface such that respective evaluation values of the plurality of evaluation indicators of each of the plurality of candidate plans are comparable,
wherein the plurality of candidate plans comprise a first candidate plan and a second candidate plan, the first candidate plan has the most favorable evaluation value of a first evaluation indicator specified as a highest priority evaluation indicator from among the plurality of evaluation indicators, and the second candidate plan has the most favorable evaluation value of a second evaluation indicator specified as a second-highest priority evaluation indicator, and
wherein the first candidate plan is set as a default plan;
selection receiving means for receiving a selection on a final plan among the plurality of candidate plans from a user input on the user interface, wherein the plurality of tasks arranged in the final plan comprise at least one printing task to be performed by the printing machine at a first designated time period, at least one cutting task to be performed by the cutting machine at a second designated time period, and at least one binding task to be performed by the binding machine at a third designated time period; and
machine performing means for causing the printing machine to perform the at least one printing task at the first designated time period according to the final plan.

* * * * *